(12) United States Patent
Fletcher

(10) Patent No.: US 8,090,782 B2
(45) Date of Patent: Jan. 3, 2012

(54) ELECTRONIC MESSAGING SYSTEM AND METHOD

(76) Inventor: Boaz Fletcher, Efrat (IL)

( * ) Notice: Subject to any disclaimer, the term of this patent is extended or adjusted under 35 U.S.C. 154(b) by 578 days.

(21) Appl. No.: 11/968,843

(22) Filed: Jan. 3, 2008

(65) Prior Publication Data

US 2008/0168146 A1 Jul. 10, 2008

(51) Int. Cl.
*G06F 15/16* (2006.01)
(52) U.S. Cl. ...................................................... 709/206
(58) Field of Classification Search .................. 709/206, 709/200
See application file for complete search history.

(56) References Cited

U.S. PATENT DOCUMENTS

| 7,593,995 | B1 * | 9/2009 | He et al. ........................ 709/206 |
| 2002/0188722 | A1 * | 12/2002 | Banerjee et al. ............... 709/225 |
| 2005/0091300 | A1 * | 4/2005 | Starbuck et al. ............... 709/200 |
| 2006/0036570 | A1 * | 2/2006 | Schaefer et al. .................. 707/1 |
| 2008/0028027 | A1 * | 1/2008 | Jachner ......................... 709/206 |

\* cited by examiner

*Primary Examiner* — Firmin Backer
*Assistant Examiner* — Brian P. Whipple
(74) *Attorney, Agent, or Firm* — Deborah Gador

(57) ABSTRACT

An electronic messaging system and method, the system including at least two electronic messaging platforms, each electronic messaging platform including software for generating electronic message loquia, each electronic message loquium including a file consisting of message content and identification information, software for carrying out background messaging between the two platforms concerning transmission and receipt of the loquia, means for reading loquia, and a display for displaying the loquia.

15 Claims, 16 Drawing Sheets

Loquium Generation and Assembly

| Conversation Window – Introducing Conversations |
|---|
| File  Edit  View  Message  Security  Tools  Help |
| Participants: Me; Rudolph (Office); Rudolph (Football)<br>Observers:  Atty. A. Shyster |
| Me 01/01/2008 14:40:45 |
| Hi Rudy,<br><br>This is the client prototype. In my first presentation to you I discussed the concept. Now you have the real thing in your hands. Take some time to explore it. The first thing you will notice is how much sense this makes in our e-mail driven world. "e-mail overload" will be a thing of the past. |
| Rudy 01/01/2008 15:02:12 |
| Thanks for sending it to me. Is it alright for me to share with others in the office? |
| Me 02/01/2008 09:35:11 |
| You'll notice that you and I are the participants, and there are also 'Observers'. You can add more if the security settings allow you to. |
| Rudy 02/01/2008 12:52:00 |
| I found the security settings, and now I see that the originator of the message sets the permissions for all of the ensuing dialog in the conversation. |
| Me 02/01/2008 15:32:33 |
| That is true for the conversation originator, and for the author of each loquium as well. There can be separate permission settings for each loquium |

Figure 5b

| Conversation Window – Introducing Conversations |
|---|
| File  Edit  View  Message  Security  Tools  Help |

Participants: Me; Rudolph (Office); Rudolph (Football)
Observers:    Atty. A. Shyster

| Me<br>01/01/2008<br>14:40:45 | Hi Rudy,<br><br>This is the client prototype. In my first presentation to you I discussed the concept. Now you have the real thing in your hands. Take some time to explore it. The first thing you will notice is how much sense this makes in our e-mail driven world. "e-mail overload" will be a thing of the past. |
|---|---|
| Rudy<br>01/01/20<br>15:02: | 160 right for me to share with others in the office? |
| Me<br>02/01/20<br>09:35:1 | Reply<br>Reply To Sender  170<br>Reply To Originator<br>────────────────<br>Spin Off New Thread From Here<br>Spin off New Thread To Author<br>New Conversation To ><br>────────────────<br>Hide Previous Loquia<br>Edit Loquia    180<br>Revoke Loquia<br>────────────────<br>Add Recipients |
| Rudy<br>02/01/20<br>12:52:0 | d now I see that the originator of the message e ensuing dialog in the conversation. |
| Me<br>02/01/20<br>15:32:: | originator, and for the author of each loquium ermission settings for each loquium |

Figure 6

| Conversation Window – Introducing Conversations | | |
|---|---|---|
| File Edit View Message Security Tools Help | | |
| Participants: Me; Rudolph | Settings... 190 | |
| Observers: Atty. A. Shys | Authenticate | |
| | Conversation Permissions... 192 | |
| | Conversation Expiry... 194 | |
| Me<br>01/01/2008<br>14:40:45 | Hi Rudy,<br>This is the client<br>concept. Now yods. ____ ome time to explore 196<br>it. The first thingse kes in our e-mail<br>driven world. "ethe Encryption ><br>Signature 198 |
| Rudy<br>01/01/2008<br>15:02:12 | Thanks for sending it to me. Is it alright for me to sh others in the office? 200 | |
| Me<br>02/01/2008<br>09:35:11 | You'll notice that you and I are the participants, and there are also 'Observers'.<br>You can add more if the security settings allow you to. | |
| Rudy<br>02/01/2008<br>12:52:00 | I found the security settings, and now I see that the originator of the message<br>sets the permissions for all of the ensuing dialog in the conversation. | |
| Me<br>02/01/2008<br>15:32:33 | That is true for the conversation originator, and for the author of each loquium<br>as well. There can be separate permission settings for each loquium | |

Figure 7

ELECTRONIC MESSAGING SYSTEM AND METHOD

FIELD OF THE INVENTION

The present invention relates to electronic messaging in general, and, in particular, to an electronic messaging system.

BACKGROUND OF THE INVENTION

E-mail is the most popular use of the internet in absolute terms, and its origins predate the World Wide Web by more than a decade. It was first used to send messages between participants inside a closed system, such as a university computer lab, and later expanded to enable asynchronous messaging inside the same domain (i.e. university campus). Once the various academic and military institutions began to integrate their communications systems, e-mail as we know it today, with the ubiquitous '@' symbol, came into being.

In the pre-internet and pre-multimedia era, e-mail was a text-based messaging system. Over time, an extensive infrastructure has been laid down for the transport and handling of e-mail. However, this infrastructure is the naturally evolved path that post-facto deals with the additional demands made by today's e-mail users, and is more in reaction to their demands than in anticipation of their needs.

The added load of large-volume transmissions, especially file downloads and media broadcasts from internet websites, has spurred the development of higher-bandwidth, always-on networks, such as broadband/DSL. Due to their higher capacity, point-to-point networks, which do not require intermediary servers, became feasible.

E-mail today is an amalgam of attachments, endless forwards and replies (with all prior text included), subject changes, and multiple recipients appearing, disappearing and reappearing. In short, people use e-mail to hold conversations. However, conventional e-mail clients and servers are not designed to display conversations in a concise, clear, and intuitive manner. Rather, they include additional material which obscures the actual exchange.

As a partial attempt to rectify the shortcomings of e-mail, other electronic messaging systems, such as internet messaging and Voice over IP telephony, have been invented.

Accordingly, there is a long felt need for an electronic messaging system which provides a user-friendly display of the content of continuing exchanges, so as to facilitate electronic conversations.

SUMMARY OF THE INVENTION

The electronic messaging system of the present invention provides a novel approach to electronic messaging in multi-modal and multi-media environments by facilitating consistent electronic dialogue among a plurality of electronic devices and platforms, taking into account ease-of-use, administration, security (against phishing, identity theft, spoofing, etc), junk, attachments, different user types (ranging from the individual home user to employees of global corporations), transport, storage, accountability and regulations. The emergence of 'conversation-thread' ordering of messages by such notables as Microsoft's Outlook, Google's G-Mail and Yahoo! Groups' mail lists confirms that some in the industry have seen that the interface we are using today doesn't meet the reality of how people use systems such as e-mail and internet messaging. The maturation of point-to-point internet communication and the access to high-speed broadband internet for a significant portion of communication consumers provide the infrastructure foundation for the present invention.

At its core, the present invention is based on the concept of the transmission and intelligent assembly of message loquia. A loquium is a single unit of an on-going conversation in the form of a file or message, which contains the content of the message and bare details of the timing and sender of the message, as well as a loquium identifier, from which extraneous material has been omitted. Each participant in an electronic messaging chain, or conversation, contributes loquia to the conversation, which can range from a monosyllabic reply to heavily annotated and formatted text with inserted images, video, sound, spreadsheets, or any other file type. The loquia contain only the new contribution of the participant without the burden of prior dialogue or previous attachments. In this way, a user is presented with the flow of a conversation in a manner which he can easily understand, browse, and configure to his own preferences. According to a preferred embodiment, attachments are incorporated within the loquium to which they were attached, and, once received by the messaging system, are stored in their own repository and indexed to the particular loquium.

There is provided according to the present invention an electronic messaging system including at least two electronic messaging platforms, each electronic messaging platform including software means for generating electronic message loquia, each electronic message loquium consisting of a file including message content and identification information, software means for carrying out background messaging concerning transmission and receipt of loquia between the two platforms, means for organizing the loquia according to the identification information, and a display for displaying loquia.

There is also provided according to the invention an electronic message conversation including a file including at least one electronic message loquium, each loquium including a file consisting of message content and meta-data including identification, permission information, addressing information, and security information, and a Loquium Identifier (LID) permanently associated with the loquium permitting assembly of conversations including that loquium according to a pre-selected order.

There is further provided according to the invention a computer program product including instructions which, when carried out by a computer, cause the computer to perform the following steps: begin a conversation by selecting participants, notify each of the participants of desire to send message, await receipt of acceptance or rejection from each of the participants, and upon receipt of acceptance, send a message to each accepting participant.

BRIEF DESCRIPTION OF THE DRAWINGS

The present invention will be further understood and appreciated from the following detailed description taken in conjunction with the drawings in which:

FIG. 5b is an illustration of a program screen that displays loquia organized as a conversation, according to a different embodiment of the invention where loquia and their related meta-data are displayed in a single column;

FIG. 6 is an illustration of a program screen displaying loquia organized as a conversation, and some of the conversation control commands available, according to one embodiment of the invention;

FIG. 7 is an illustration of a program screen displaying loquia organized as a conversation, and some of the security control commands available, according to one embodiment of the invention;

DETAILED DESCRIPTION OF THE INVENTION

The present invention relates to an integrated electronic messaging system, permitting exchange of e-mail, instant messaging (IM), Voice over IP (VoIP), or any other type of on-line synchronous or asynchronous messaging between any number of participants, or any combination of the above.

The electronic messaging system of the invention is preferably embodied in client software for running on each user's personal computer or other computing or communications platforms.

1. Conversation-based Threaded Electronic Messaging System

As in human conversation, dialogue through the electronic messaging system of the present invention is comprised of a series of exchanges between parties to form a conversation. Each individual exchange is encapsulated in a data format that has been optimised for transmission over computer and communications networks, referred to in this application as a "loquium".

Definition of a Loquium

Figure 1:
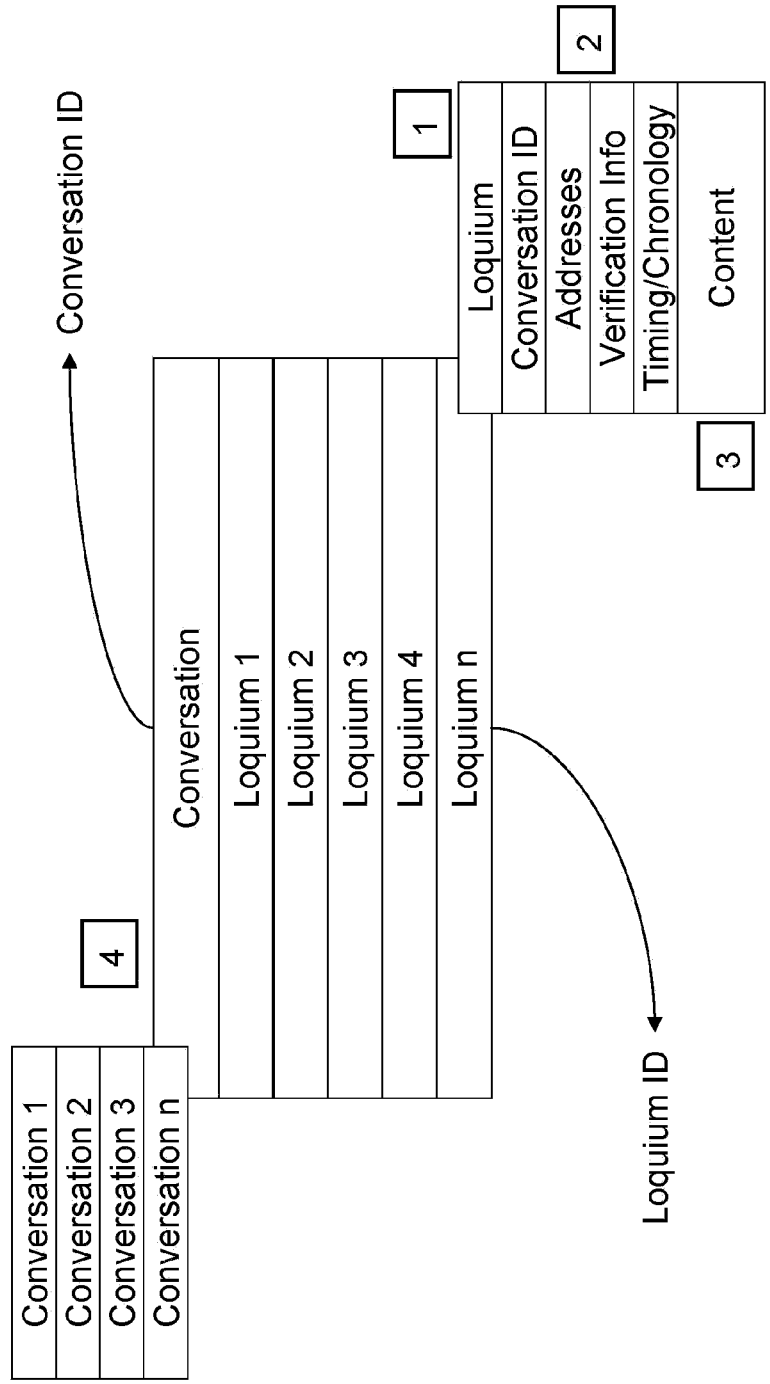
FIG. 1 is a schematic illustration of the fundamental building blocks of conversations and loquia in accordance with one embodiment of the present invention.

FIG. 1 is a schematic illustration of the fundamental building blocks of conversations and loquia, in accordance with one embodiment of the present invention. A loquium 1 is a single unit of an on-going conversation 4 in the form of a file or message which contains the content of the message from which extraneous material has been omitted, and bare details of the timing and sender of the message, as well as a loquium identifier.

A loquium is a structured electronic file format that, in a preferred embodiment of the invention, is comprised of a file body which contains the content 3 of the exchange, and additional information, also known as meta-data 2, that describes the characteristics of the content and the loquium itself, and may have instructions for the handling, processing, security, permissions, verification, authentication, and versioning of that loquium. It is appreciated that this is a partial, and not exhaustive, list of the possible meta-data. The loquium may be partitioned between content and meta-data, although it need not be in all embodiments of the invention. The meta-data may be identified and demarcated by the use of specific characters or other field delimiters, or may use specific-length fields of a certain order and position within the meta-data portion of the loquium, should one have been defined.

The content area of a loquium contains both text and binary data; the text and binary data may also be interspersed with certain identifiers that may be used in verifying and authenticating the content, marking certain features of the content for use in display or other processing of the content, or securing the content. As an optimisation of this invention, a single loquium may be divided amongst several loquia to facilitate efficient transmission of the loquium over computer and communications networks, and as a means to provide greater security during the transmission of the loquium.

Permission Features of a Loquium

Recipients of a conversation are of three classes with differing rights to participate in the conversation. They are: Participants, with full rights to read and reply to the loquia in a conversation; Observers, who receive the loquia, but do not have writing or editing permissions; and Hidden Observers, who have the same rights and permissions as Observers, but whose identities are not displayed to the other Recipients.

An originator of a conversation can activate, for example, through the use of a security command 194 on security menu 190 on FIG. 7, a series of conditions that govern the conversation: who may participate and how; if others may be added or their status changed; if a conversation or loquium can be forwarded outside the recipients' list; if replies are distributed to the list or come directly to the originator (generally in conjunction with using Hidden Observers); if the Recipient can save attachment files independently of the loquium; printing of the conversation or loquium; copying of the conversation or the loquium. By use of security command 196, the user can set the lifetime of the message (i.e., read once; until a certain date; limited to a number of forwards and replies; until a certain condition or conditions have been fulfilled). These conditions are codified in an alphanumeric code that may be part of the meta-data. The code is recognised by the client application software and the included conditions are implemented by the client software for the received conversation or loquium.

Each loquium is assigned a unique alphanumeric string as an identifier, referred to in this application as a Loquium Identifier ("LID"). Each conversation is assigned a unique alphanumeric string as an identifier, referred to in this application as a Conversation Identifier ("CID")

These parameters are encoded within the meta-data area of the loquium in the form of an alphanumeric string recognised by the client computer program. These parameters form a permanent part of the loquium and are transmitted along with the loquium, or any loquia that form part of the on-going conversation, each time the loquium is transmitted.

Together these rules can fashion many different conversation types and be used to disseminate invitations, polls, announcements and missives. This conditional information is stored within the loquium and read by the client program upon receipt and disassembly of the loquium by the Loquium Processing Engine ("LPE"), described below with reference to FIG. 13.

The client program will disable and/or deactivate the conversation reply commands for participants whose status is Observer or Hidden Observer. The client program will disable and/or deactivate the user commands in accordance with the parameter settings encoded within each conversation and loquium.

Generating and Assembling a Loquium

Figure 9:
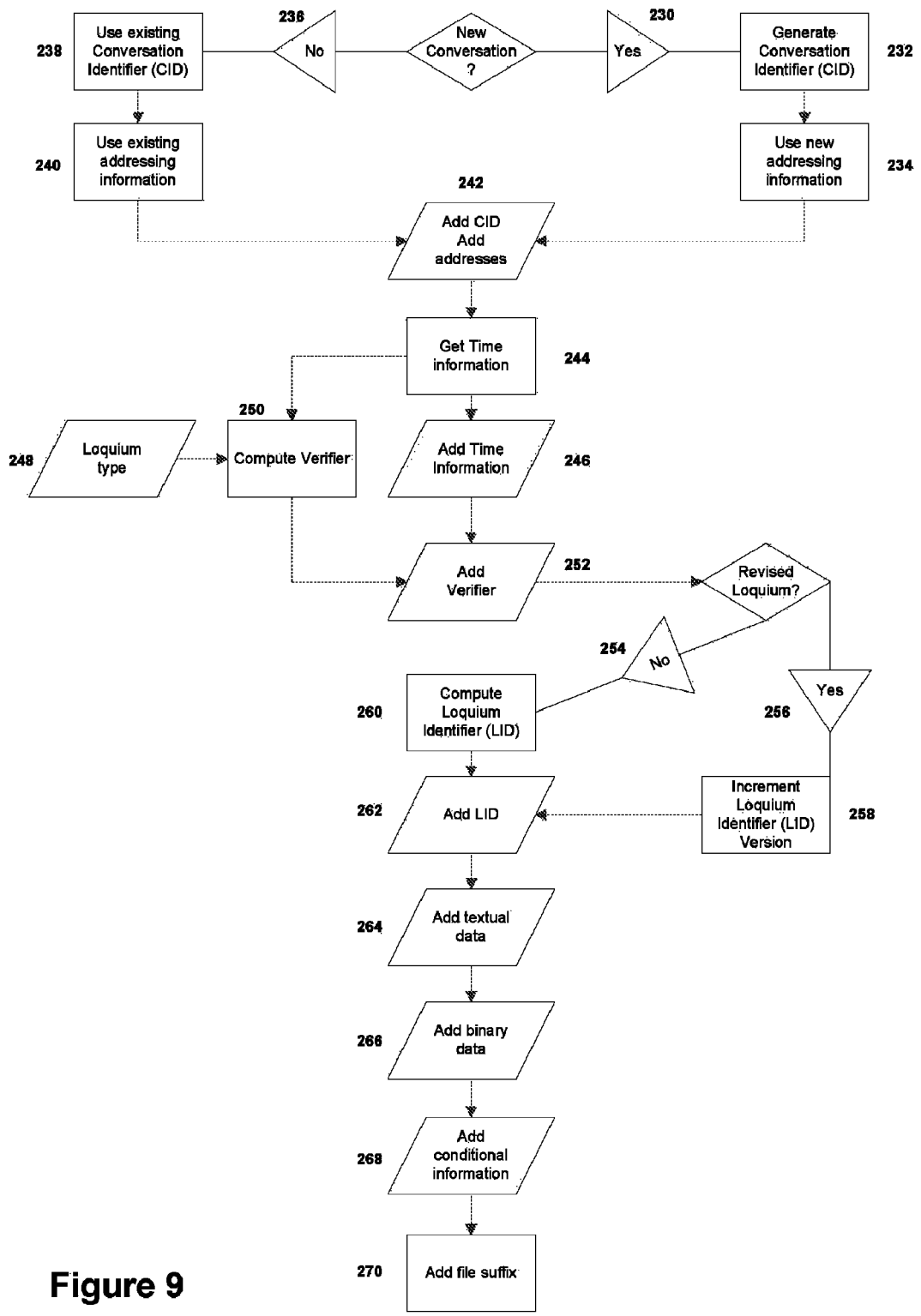
FIG. 9 is a flow chart illustrating loquium generation and assembly, according to one embodiment of the present invention.

FIG. 9 is a flow chart illustrating loquium generation and assembly, according to one embodiment of the present invention. A loquium comprises a meta-data area and a content area in an electronic file format. A user creates content in a capable editor. If the loquium is the first loquium of a new conversation 230, the computer program application creates a new Conversation Identifier ("CID") 232, as described below. If the loquium is a part of an existing conversation 236, the current CID 238 is used. The CID 232 or 238, and addressing information of the electronic messaging platforms of the Recipients 234 or 240, are added to the meta-data area of the loquium 242. Chronological information 244 is acquired from a reliable time source, such as the internal clock of a personal computer, and added to the meta-data 246. The chronological information and an alphanumeric code 248 specifying the type of loquium are multiplied together to create a verification code 250, which is added to the meta-data 252. If the loquium is a new loquium 254, a Loquium Identifier ("LID") 260 is generated, as explained below.

If the loquium is not a new loquium 254, but a revision of an existing loquium 256, as explained below, the existing LID is used with a revised version number 258, as by incrementing the original LID. The LID 258 or 260 is added to the meta-data 262. Any textual 264 or binary data 266 is added to the electronic file. An alphanumeric code containing the permission conditions 268 is added to the loquium, and a file suffix 270 is added to mark the end of the loquium.

Figure 10:
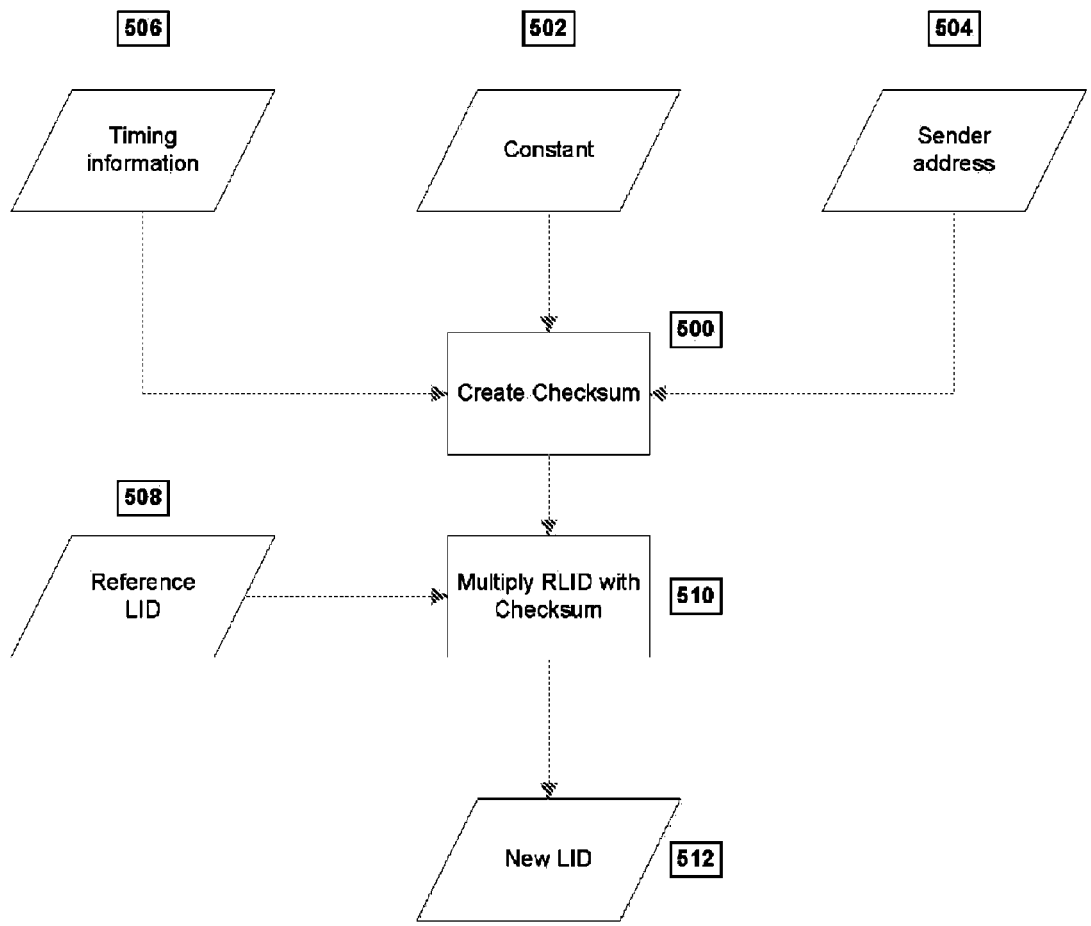
FIG. 10 is a flow chart illustrating generation of a loquium identifier, according to one embodiment of the present invention.

FIG. 10 is a flow chart illustrating generation of a unique loquium identifier ("LID"), according to one embodiment of the present invention. A checksum 500 is calculated, which is the product of a mathematical operation that uses a randomly generated unique number 502, such number generated by means common in the art, the sender address 504 and the chronological information 506 as the factors. If the new loquium is a response to a previous loquium, the LID of this previous, or parent, loquium is used as the reference LID 508. Otherwise, the CID may be used as the reference LID. The reference LID 508 and the checksum 500 are the factors for a further mathematical operation 510 the product of which is the new LID 512.

The unique identifier LID, described in FIG. 10, enables the client program to assemble a conversation in proper chronological order and context or any such ordering as per user preference, even if loquia were received in an out-of-sequence order. As each loquium is unique and built from known components, the client program can disassemble the Loquium Identifier into its constituent components and derive both the 'parent' LID and the timing information. In this way, the client program can relate a received loquium to both the conversation and loquium within that conversation to which it refers, and use the chronological information to place the received loquium in its proper order in the conversation.

In this way, all of the message loquia are assembled to form a whole conversation with any number of participants and in a way that mirrors the flow and style of normal human conversation.

Loquium Parser and Processing Engine

The system of the present invention provides for unattended operation on a continuing basis. To this end, a parsing and processing engine for incoming and outgoing loquia is envisioned in a preferred embodiment of the invention, illustrated schematically in FIG. 13. The Loquium Processing Engine ("LPE") 400 is a set of computer-readable instructions that can be executed on a computing platform with an appropriate central processing unit and operating system. Its operation is independent of a client computer program 420 utilised by a user to engage the present invention. The LPE may execute on the device used by an end-user, or may execute in a centrally accessible location, such as a server computer, or other computing appliance.

The LPE 400 is a self-contained set of computer executable instructions that has 4 external interfaces: interface 410 to a client computer application 420, interface 430 to a communications network or plurality of communication networks 440, interface 450 to a series of indices 460 associated with the invention, and interface 470 to data storage area 480 which may be both local 490 or remote 485 and accessed over some computer network.

The LPE continually polls the communications network for indications of reception activity. Upon receiving an indication that a transmission reception has taken place and has completed, through means commonly used in the industry, the LPE attempts to parse the received file. The first action is to inspect the received file for compatibility with known loquium configurations. If the LPE determines that it has received a compatible loquium, the LPE identifies the meta-data area and extracts the information from the meta-data area. The LPE then constructs a query to the indices area 460 using information gleaned from the meta-data area: CID, LID, date, sender information, size, and attachments. Following this step, the LPE archives the loquium in the preferred or indicated storage area. If the loquium contains at least one attachment, the LPE may extract the attachment file or files, place them in a storage area, update the indices, and replace the file attachment with a link to the extracted file, before placing the loquium in a storage area.

When a client computer program 420 is first loaded into the active memory of a compatible device, it notifies the LPE 400. The LPE continually polls the established connection 410 to the client application. The LPE brokers any requests made by the client application 420, such requests generated as a consequence of a user action or an automated action embodied in computer instructions by the client application 420, to the data storage areas, indices, and communications networks.

The LPE, while polling the indices part 460 of the system, notes changes to the master record of conversations for each user that is currently registered as active with the LPE. The LPE 400 will cause the client application 420 to update the list of conversations. Should there be changes to a conversation, and that conversation is currently displayed in a window or screen, the conversation will be updated with the contents of the new loquia.

When a user invokes a loquium editor to create a new loquium as part of a new conversation, or in participation in an existing conversation, the LPE is requested to create a loquium from the content, addressing information, CID and the LID of the parent loquium, as described below. The LPE will prepare a file or message according to the specifications for the format of a loquium, generate a new LID for the loquium according to the method prescribed, and append any file attachments, if so indicated. In the case where the loquium is the first loquium of a new conversation, the LPE also generates a new CID. In the event that a user modifies an existing loquium, the LPE will add versioning information to the existing LID, for example, by incrementing the LID. The LPE then places the assembled loquium in a storage location 435 and invokes transmission over the communications connection 430, as described below.

Figure 12:
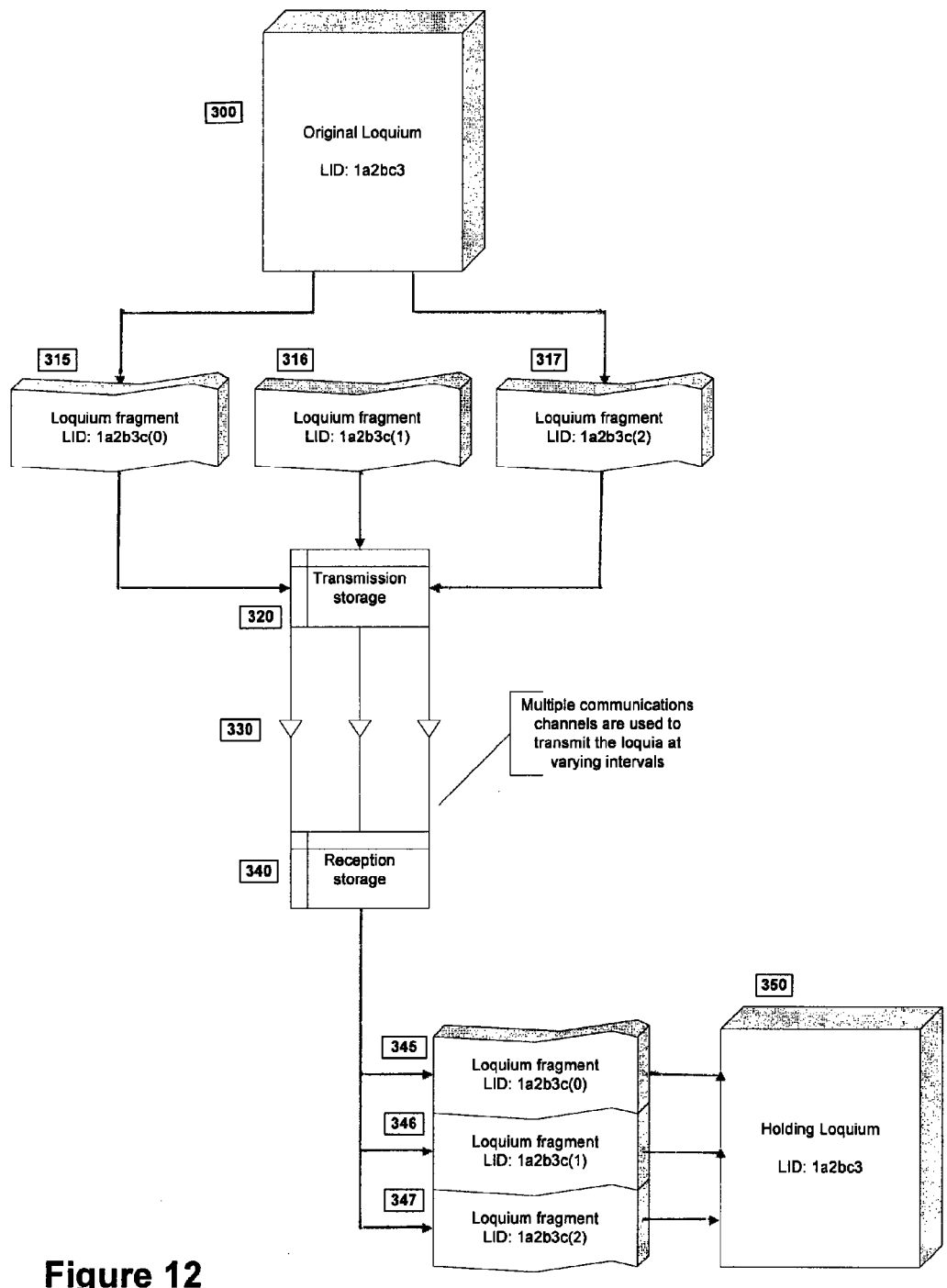
FIG. 12 is a flow chart illustrating apportioning a single loquium to multiple loquia, transmission of the loquia over several communications conduits, and reassembly of the original loquium by a recipient, according to one embodiment of the present invention.

In the event that the LPE has received a single logical loquium which has been partitioned over a plurality of physical loquia, as illustrated in FIG. 12 and explained below, the LPE will create a temporary holding loquium in a storage area, extract the meta-data and content from each arriving loquium, and assemble the content area in the holding loquium. Once the holding loquium is completely assembled, the LPE moves the holding loquium to a storage area.

In the event that an existing loquium is modified, the LPE will revise the LID with versioning information before assembling and transmitting the loquium.

The LPE also acts as an intermediary between the client application software, the data storage areas and the indices by: parsing query strings from the client application; relaying information requests to the data storage areas; and querying the indices.

Display of a Conversation

In a preferred embodiment of the invention, a client computer program, which may be implemented for such devices as a personal computer, a handheld computer, a portable telephone with a central processing unit and software operating system, or for use through an internet browser on a device that is connected to the internet, either with a permanent or opportunistic connection to the internet or other communications network, is the user's preferred means of interaction with the loquia. This program is connected to local or remote indices 460 of the loquia present in local or remote storage 480. A master index of conversations and loquia 465 maintains information on the conversations to which the collections of loquia are assigned. The client program assembles a human-readable list of these conversations and presents them to the user in such a manner as to make navigation and triage of the conversations easily comprehensible.

Figure 4:
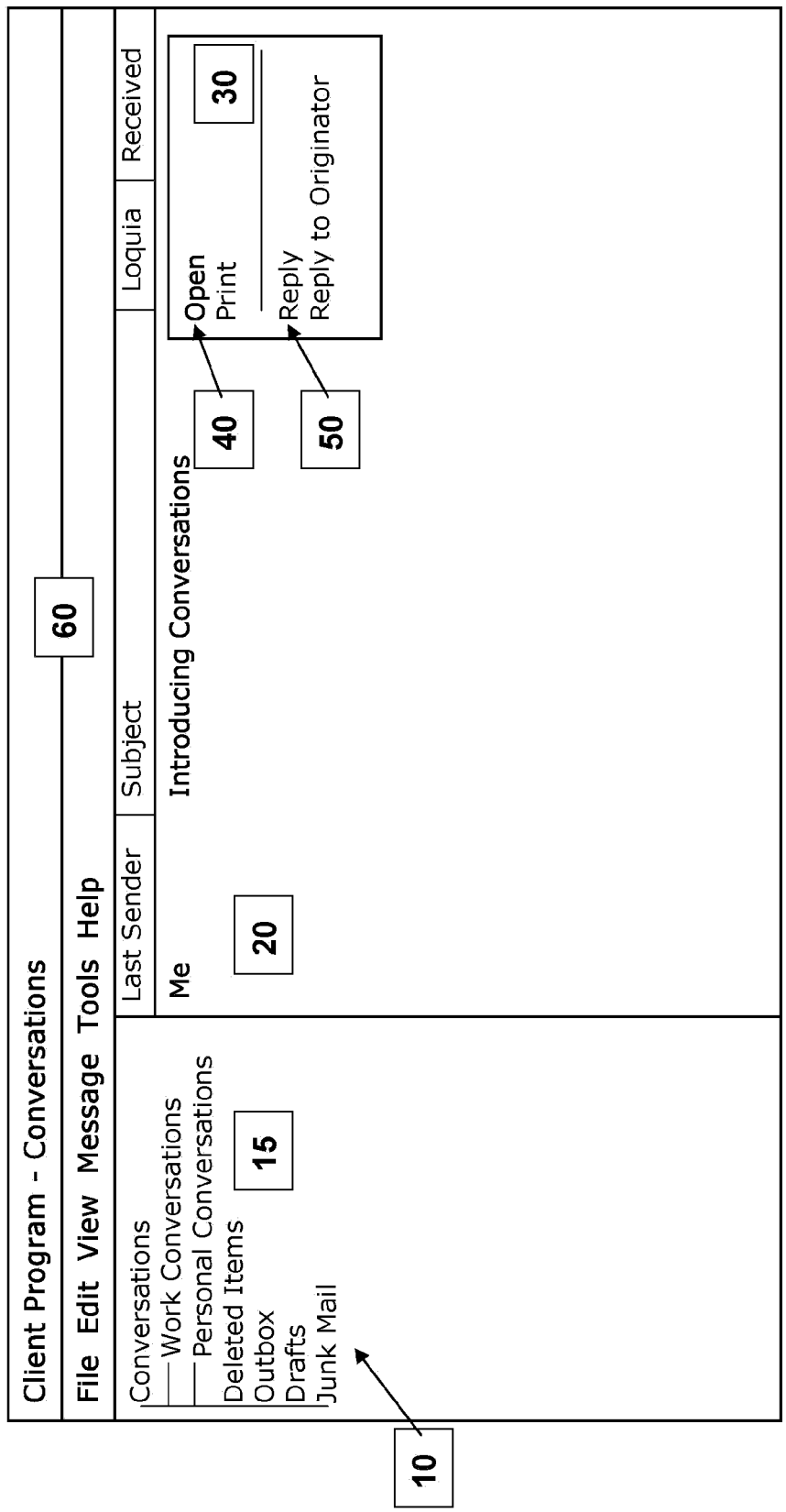
FIG. 4 is an illustration of the main program screen which lists and organizes the available conversations, according to one embodiment of the invention.

FIG. 4 is an illustration of the main program screen which lists and organizes the available conversations, according to one embodiment of the invention. A list of each conversation's details are organised in the conversations pane 20. The list of conversations may be all the conversations available to the user, or may be a subset of such conversations, as filtered or otherwise masked by deliberate user action, or as the indirect result of a user action, or as a consequence of computer instructions in the client computer program or a server computer program. One means for filtering conversations is by the use of the folder arborescence 10. By means common on the device or platform, the user selects a particular node or 'folder' of the arborescence. The client computer program requests the LPE 400 to query the indices 460 for a list of all conversations available to the user that are logged to the selected folder in the user index of conversations. The conversations' details are displayed in the conversations pane 20.

A user may further interact with the conversations listing by means of context-menu 30. The default action in one embodiment of the main program screen is to open the conversation using the Open command 40. Another common action that a user may wish to perform is to reply to the conversation using Reply command 50. The user may instigate further messaging and maintenance actions through the use of the menu bar 60.

Upon selection of a conversation by the user through means that are in common use on the device, the client program 420 requests the loquia associated with the selected conversation, as per that conversation's CID, from the Loquium Processing Engine ("LPE"), generates a new screen or window and assembles a structured conversation from a subset of the loquia stored in data storage area 480, as determined by the master record of conversations and loquia 465 (see below). The conversation is rendered by the client application from both the content and meta-data of the loquium. The content is rendered with the formatting as transmitted by the originator of the loquium, to the extent that this is supported by the device or operating system. In a preferred embodiment of the invention, the receiving user may also determine the display formatting of the loquia.

Figure 5A:
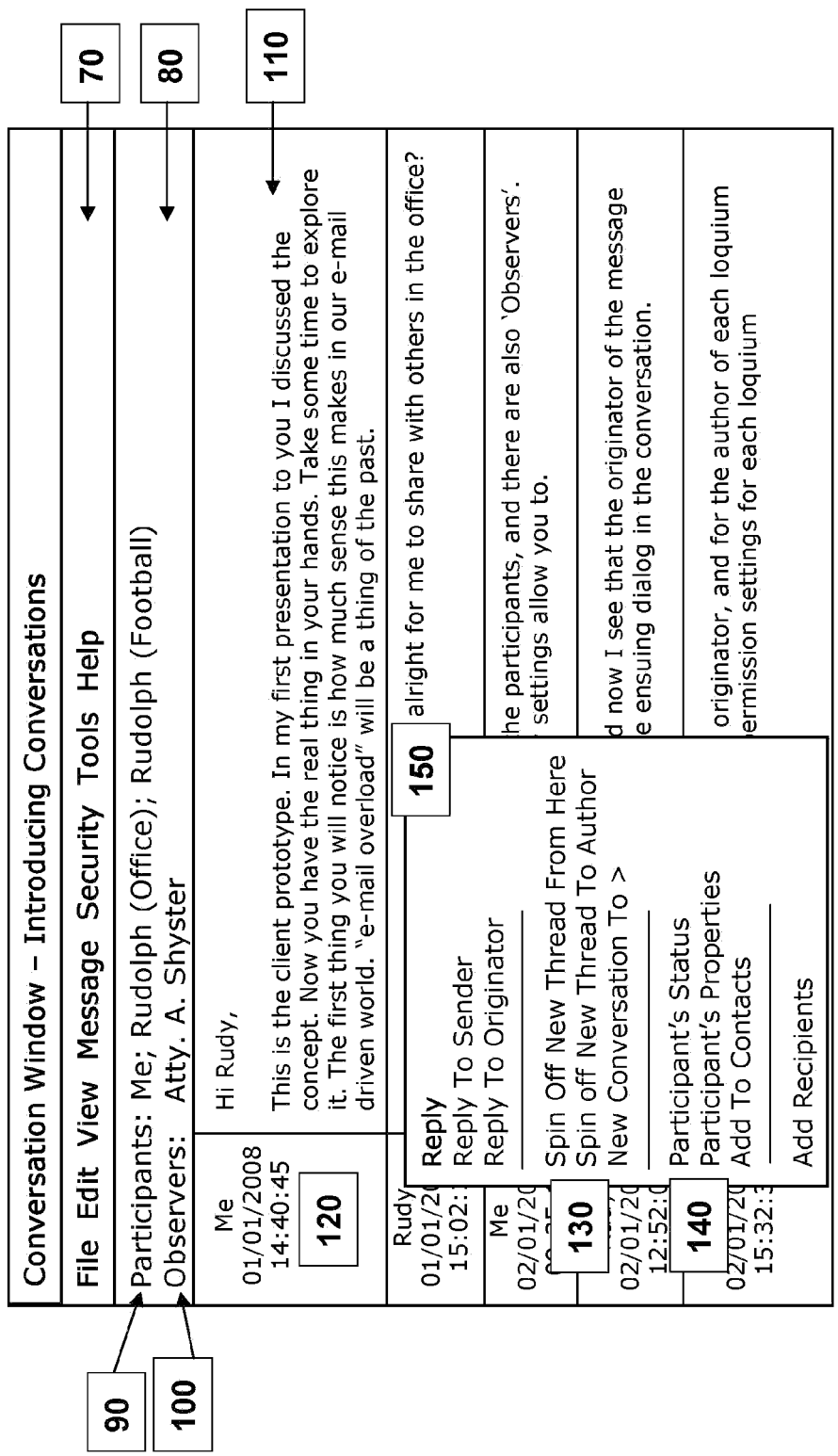
FIG. 5a is an illustration of a program screen that displays loquia organized as a conversation, according to one embodiment of the invention where loquia and their related meta-data are displayed in multiple columns.

A conversation can be displayed chronologically, either first-to-last or last-to-first, grouped by date, or by originator/author of the loquia, and loquia can be masked so that they are not displayed to the user, for example: loquia she has previously seen; loquia before a certain date; loquia sent from certain authors or domains; or loquia that contain file attachments. The loquia are assembled in a single column as per the chosen, preferred, or default ordering. Each loquium may be delineated through the use of graphical elements such as a line, colour, or design pattern, such as shown in FIG. 5*b*, or rendered in paragraph/section style similar to printed text, such as shown in FIG. 5*a*. The first loquium displayed in the conversation window or screen may be the first loquium of the conversation, in the case of a newly received conversation or as per user preference, or may be positioned at the location of the last read loquium, newly arrived loquia, or any other point defined by the user (such as a bookmark or flag as stored in the indices 460), as per individual user preference. As loquia may be received in an out-of-order sequence, this means of ordering and display creates a coherent conversation from the corpus of received loquia per conversation.

In the screen or window that displays the conversation and is ordered as per the user preference or default display settings, each displayed loquium is associated with a subset of the meta-data, such as identity of the sender (which could be a messaging system identifier, such as an e-mail address or Internet Messaging identifier, a partial or full name, an image, or a nickname that the user associates with the sender), chronological information associated with the loquium, the online connection status of the sender (where the client program has the means to discern such through interconnections to services provided over the Internet, local or remote computer networks, or over public and private telephony communications networks), length of the loquium, and device type/class from which the loquium was sent. By user choice, selection, or default setting, this information is displayed in human-comprehensible format in a separate column on the same row as its associated content, or as a row above the content, as shown in FIGS. 5*a* and 5*b*, respectively. On devices and computing platforms that support the standard user interface elements of "bubbles", "tool-tips", or "pop-ups", this information may also be displayed by activating the proper routine that is part of the operating system or platform, and sending the information in the format required by the routine, through common programming means. The user activates the bubble, tool-tip, or pop-up by holding the cursor over the individual loquium for the amount of time required by the aforementioned device/platform.

Conversations that are too long to fit in a single screen or window, such window size having been determined by device constraints, user preferences, or user actions, can be viewed by scrolling, by use of scroll bars or other pointing metaphors inherent to the operating system or platform, and generally automatically engaged by the platform or device.

Creating a Conversation

Figure 8A:
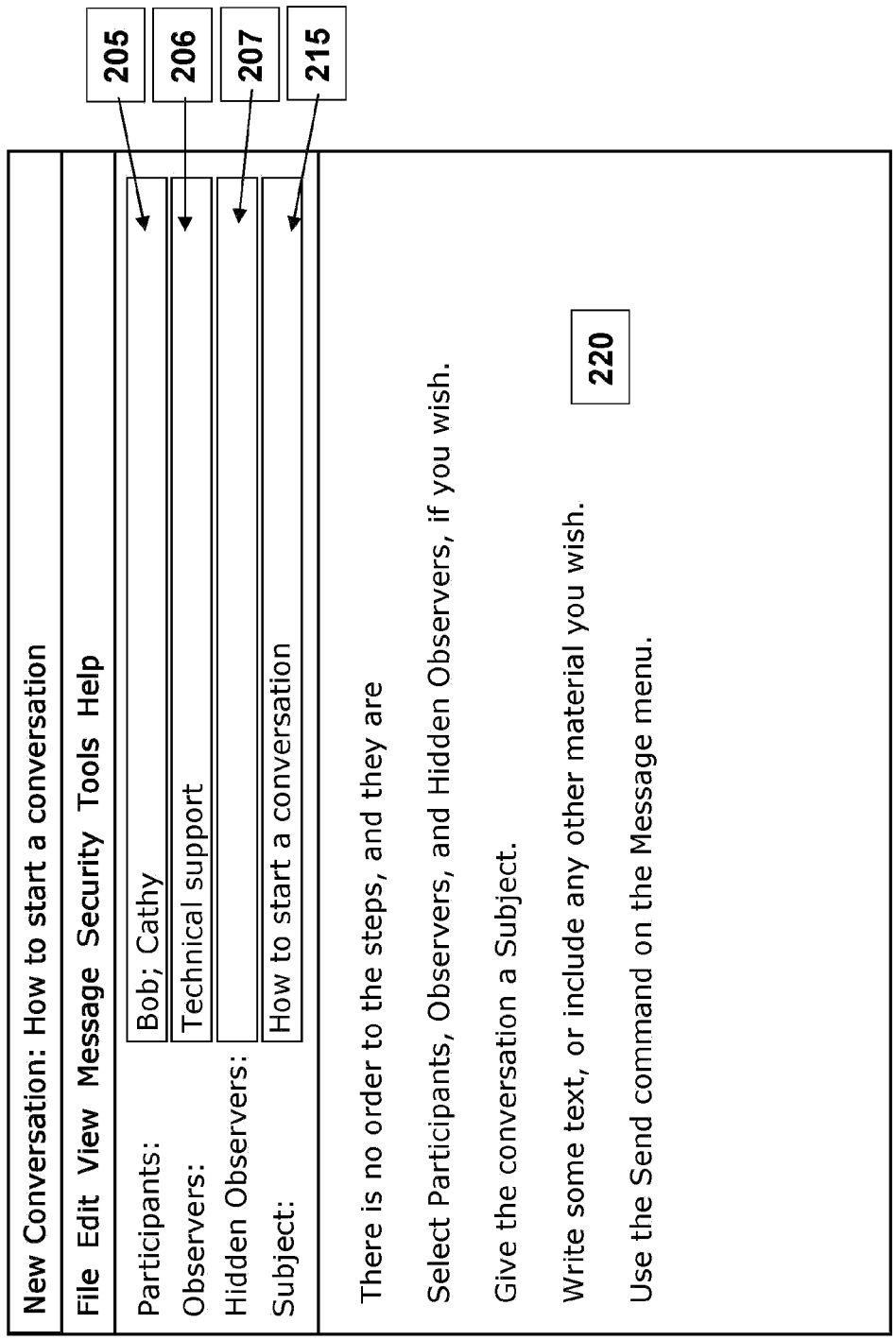
FIGS. 8a and 8b are illustrations of program screens used for participating in a conversation and for editing loquia, according to one embodiment of the invention.
Figure 8B:
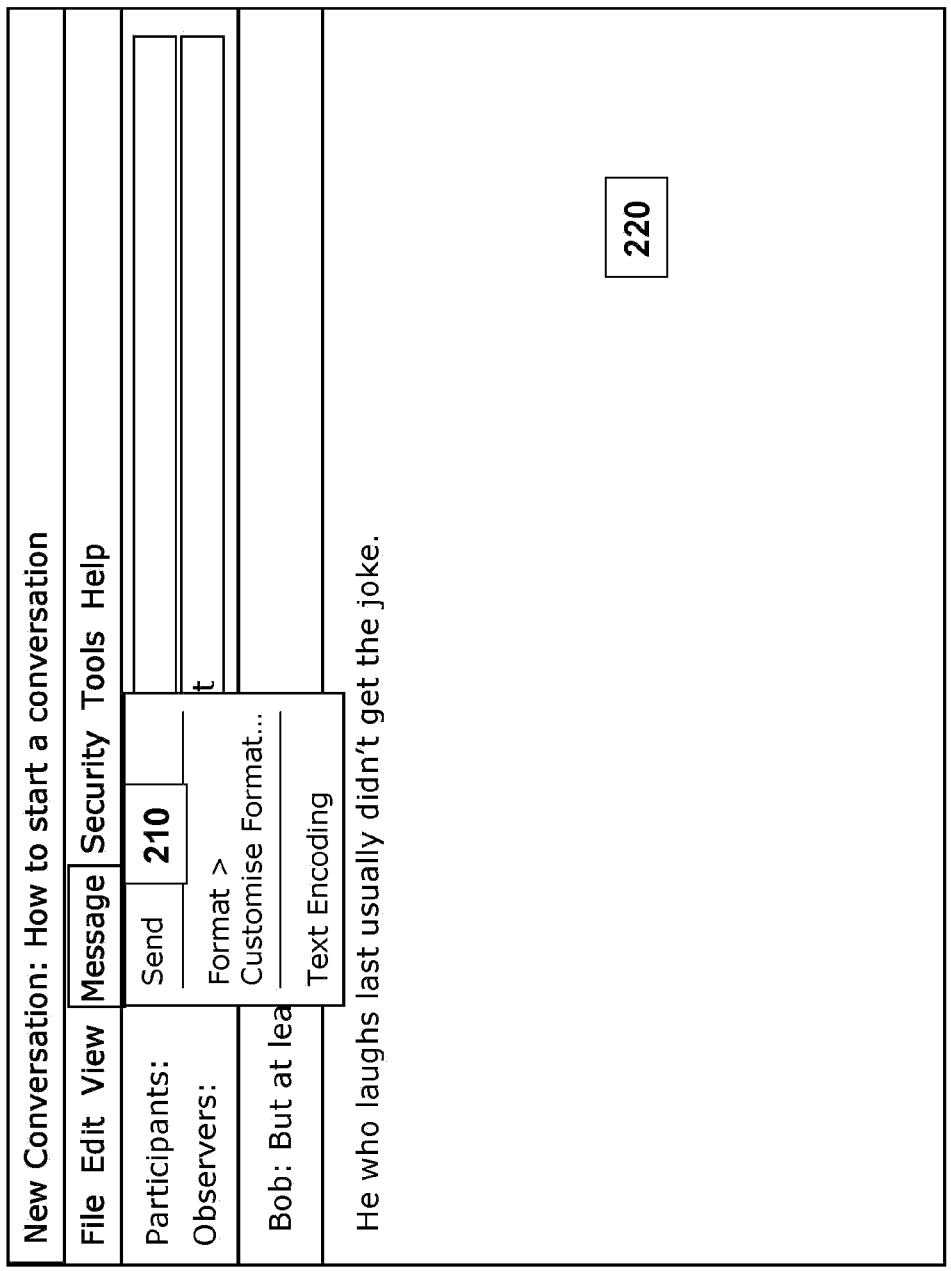

Using a client computer program adhering to the specifications of this application, a user (the "originator") begins a conversation by activating a screen or window which is an editor capable of creating loquia. FIGS. 8*a* and 8*b* are illustrations of program screens used for participating in a conversation and for editing loquia, according to one embodiment of the invention. The originator selects at least one recipient for the message from an address book either stored on the local device or stored at some other location, or manually adds the recipient's destination address. Recipients are specified by the originator of the conversation by: typing e-mail addresses known to the user and separated by a character, such as a comma or semi-colon; by selecting e-mail addresses from a store of such e-mail addresses, which may or may not be incorporated in a preferred implementation of the present invention; by selecting names or nicknames of intended recipients from a store of such information which are linked to e-mail addressing information, which may or may not be incorporated in a preferred implementation of the present invention; by selecting addressing information from lists and stores commonly used for this purpose; and any combination of the above methods.

Recipients of the conversation are of three permission classes with differing rights to participate in the conversation. They are: Participants 205, with full rights to read and reply to the loquia in a conversation; Observers 206, who receive the loquia, but do not have writing or editing permissions; and Hidden Observers 207, who have the same rights and permissions as Observers 206, but whose identities are not displayed to the other Recipients.

Optionally, the originator of the conversation can determine a subject 215 for the conversation, in order to distinguish it from other conversations and to make it easier for all Recipients to locate and identify it for further interaction.

Optionally, the originator can add content to the loquium by using the editor 220 in an editor window as shown, for example, on FIG. 8*a*. The added content can be any of: text, formatted text, rich text, HTML or other markup languages common in the art; communication addressing schemes, such as Uniform Resource Locator ("URL") links or standard file paths; binary file attachments, rich file attachments, or file attachments of other types, such as those produced by word processing and spreadsheet programs, but not limited to these types of programs. The user activates the sending command 210 seen, for example, on FIG. 8*b*, of an editor window, in order to send the loquium to the Recipients.

The client program now requests the Loquium Processing Engine ("LPE") to generate a Conversation Identifier ("CID") (see above), which is an alphanumeric string that functions as a unique serial number for this conversation. The CID is a hash, as it is known in the art, of information about the conversation, the sender's user account, the date and time as read from a reliable time source, and, optionally, the subject, and static and dynamic information about the user's device.

The client program also requests the Loquium Processing Engine to generate a Loquium Identifier ("LID"), which is an alphanumeric string that functions as a unique serial number for this loquium. The LID is a hash, as it is known in the art, of the CID, the sender's user account, type/class of device, length of the loquium, loquium type, the previous loquium's LID (if applicable, as described above), the presence and type of attachments, the date and time as read from a reliable time source, and, optionally, the subject, and static and dynamic information about the user's device.

The CID, LID, Recipients, subject, attachment information, length of loquium, date and time from a reliable time source, device type/class, and a loquium type identifier are added to the meta-data portion of the loquium. The loquium is then placed in a storage area 435 for transmission, as will be explained later in this application.

Engaging in a Dialogue by the Use of Loquia

As Participants engage in reading loquia and replying, they are collectively participating in maintaining and growing the conversation. The loquia contain only the new contribution of the participant without the burden of prior dialogue or attachments.

Participants engage in reading loquia, for example, in a display window or screen, such as illustrated in FIG. 5*a*. The loquia, ordered as per user preference, default or other conditions, are assembled and displayed as a conversation in the display area 110. Related meta-data is shown in display area 120. Conversation information area 80 displays the names of the Participants 90 and the Observers 100. The identities of the Hidden Observers are not displayed. Users may interact with the conversation from the menu commands 70, or through the Reply 150, conversation 130, and participant 140 commands on a context menu.

From a screen or window that is used for display of a conversation, as shown in FIG. 5*a*, a Participant may use the Reply command 150 to participate in the conversation. A screen or window, which is an editor capable of creating loquia content, for example, as illustrated in FIG. 8*b*, is opened, and the user is able to add content as described below.

Upon completion of his submission, the user selects a Send command 210 (FIG. 8*b*), and a loquium including this content is created in the same manner as described with regard to FIG. 9. The client computer program adds addressing information to the meta-data area of the loquium: the sender address, derived from the account information stored by the system for this sender; and address information for the Participants, Observers, and Hidden Observers, determined from the message repository on the basis of the conversation identifier (CID) already spawned by the original conversation. The loquium is then placed in a storage area for transmission, as described in this application. The loquium will be transmitted to all of the original Recipients as per their permissions class: Participants, Observers, and Hidden Observers.

As the system automatically sends new loquia to all three types of conversation recipients, one feature of the present invention is that Hidden Observers (corresponding to conventional Blind Copy recipients) maintain access to the entire conversation, and are not excluded after the first message of the on-going dialogue, as in existing electronic messaging systems, due to address information being encoded within the loquia and transmitted with each loquium, as it is sent.

Upon receipt of the loquium and subsequent verification and other security measures described in this application, the loquium is placed in a storage area, and the Loquium Processing Engine notified. The LPE will add an entry to the local or remote index of loquia, as appropriate for the user's configuration and device, and add or update an entry to the local or remote index of conversations which includes a reference counter for all loquia, as appropriate for the user's configuration and device. The LPE 400 also engages a client application 420, if it is running, and sends it a notification to update its display list of conversations, for example, list 20 on FIG. 4. The client application will display a line entry for a new conversation, or show updated information for a conversation, such as the subject of the conversation, the number of loquia in the conversation, the identity of the last contributor, and the date and time of the last submission.

Engaging in a Multi-Threaded Dialogue by the Use of Loquia

From any loquium in a conversation for which the originator has not set a restriction on replying, a user may select a command to begin a new thread within the conversation [see 130 on FIG. 5a—conversation commands]. A conversation thread is a separate dialogue between a subset of participants of the main conversation. Using the same mechanism for creating a loquium, the user selects a subset of the current Recipients, and may also add new Recipients to the thread. The user may also designate these Recipients in roles other than they may have had in the original conversation. For example, a Recipient designated as an Observer in the main conversation may be designated as a Participant in the spawned thread. It is to be appreciated that this is one possibility of many, and by no means limits or imposes upon the author the necessity to re-designate the permissions/class of any Recipient.

The client program 420 requests the LPE 400 to generate a new LID for the loquium in the new thread. The generated loquium will include a reference to the previous loquium as its parent loquium, but will maintain the same CID as the current conversation. The loquium is transmitted as described in this application.

When the client program 420 activates a particular conversation, all of the loquia that are assigned to the conversation and identified by a common and unique CID and form the user's specific view of the conversation, including loquia that are part of a thread that has been received only by a subset of the conversation's Recipients, are retrieved from the data storage area 480 and assembled by the client program 420, according to a preferred order in a window or screen, such as FIG. 5b.

Creating a New Conversation from an Existing Loquium

From any loquium in a conversation for which the author has not set a restriction on forwarding, a user may select a command to begin a new conversation [see 130 on FIG. 5a—conversation commands]. As distinct from instigating a new conversation, the selected loquium becomes the seed for a new conversation and will receive a new, unique CID from the LPE, although its LID will remain unchanged.

Once the user has activated the command, the user selects Recipients from an addressing mechanism in the same manner as starting a new conversation. The user, if she chooses to do so, can append a new loquium to the original with her own content. Both the original loquium and the new loquium, if generated, are sent to the storage area for transmission as described in this application.

Accessing Conversations on Devices that can not Host an Editor

There exist a plurality of communications devices and platforms that do not have the ability to host an editor capable of creating loquia, for example, because they do not possess an adequate processing unit, storage facility, or compatible software operating system, although this is not an exhaustive list. Such devices will have at least a human-readable display that is able to display text characters, and perhaps limited means for a user to generate text characters.

In such a situation, the processing of loquia and conversations may be embodied in a computer software program that resides on a server computer. This server computer is made accessible to the remote device through a compatible computer and/or communications network and/or telecommunications network. A software programmer reasonably skilled in the art will recognise that a preferred implementation of the computer software program will be able to process multiple requests simultaneously from a multiplicity of devices.

Figure 13:
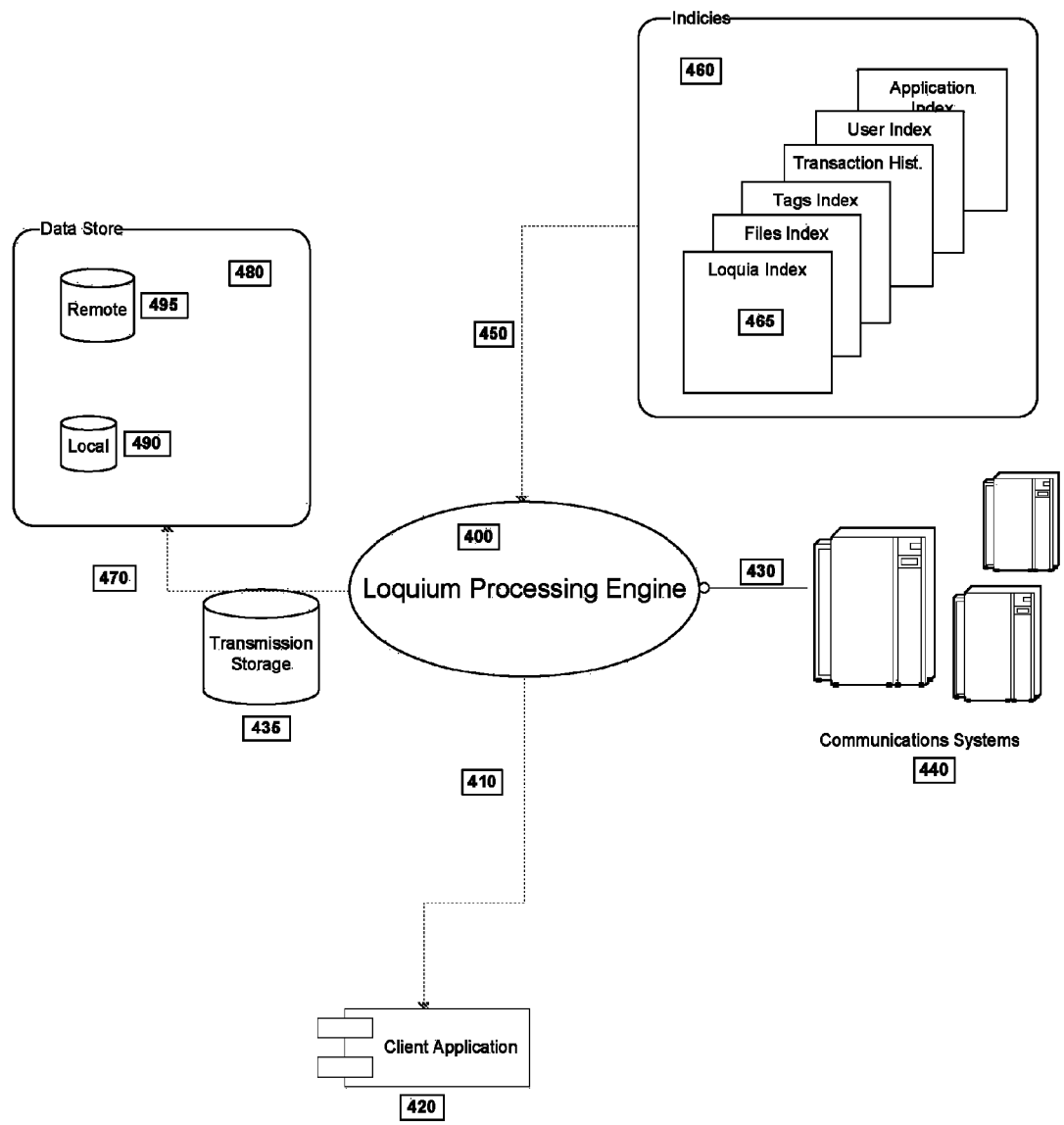
FIG. 13 is a schematic illustration of the system components and interactions, according to one embodiment of the invention.

In an embodiment which could be preferred by corporate users or others who need access to conversations over a variety of devices, the present invention is deployed as a server system and is connected by interface 430 in FIG. 13 to standard messaging gateways through protocols prevalent in the industry. The server system transforms the loquia content and relevant meta-data on the fly to a message format supported by the modal device, such as SMS or MMS, which is transported over an appropriate communications service, such as the Internet, cellular networks, "Push Message" networks, or Text-to-Voice systems.

The selection and precedence of device formats can be statistically selected based upon preconfigured user profiles or historical information, and can be dynamically selected based on each users' presence information and historical information.

Incoming messages from modal devices are received through an appropriate gateway to the server. Each message type has its own, known, format, and relays information about its format, communications channels and device type within those messages. The message is parsed according to these parameters by the server system [see FIG. 14], and a loquium or loquia are created, as described with referent to FIG. 9.

The above procedures may also be embodied within the LPE in a non-server configuration.

Viewing and Handling of Attachments in a Conversation

The content area of a loquium can contain both text and data, and said data may be in structured or unstructured format. Furthermore, the content of a single logical loquium may be partitioned and apportioned over a number of physical loquia for purposes of transmission efficiency or enhanced application security. As illustrated in FIG. 12, a preferred embodiment of the invention, a logical loquium 300, that has been divided into several physical loquia 315, 316, 317, is stored in transmission storage 320, until transmitted over a single or multiple communication channels 330 as several loquia. The loquia are received by a recipient's reception storage 340. The LPE 400, as in all other cases, catalogues the first received loquium by CID and LID, and retains the loquium in the indicated storage area 340. As further loquia are received with the same CID and LID, the LPE compares the versioning information (described below) pertinent to the LID of the loquium currently in storage with the versioning information of the newly received loquia. Upon indication that subsequent loquia are of the same version, the LPE will create a new, temporary loquium in storage as a holding loquium 350. The LPE extracts the data from the content area of the received loquia 345, 346, 347. As is common practice in the industry when dividing large files into smaller files, the content data is demarcated with boundary indicators; the LPE positions the content fragments from the loquia 345, 346, 347 within the holding loquium, in their positions as indicated by the inherent boundary markers, until all of the fragments have been recovered and the full content of the original logical loquium 300 has been reconstituted as holding loquium 350. The LPE generates a query to the appropriate indices which are updated to 'point' to the holding loquium 350 for all handling requests of the specific LID.

Typically, this scenario is more likely to happen when the loquium contains at least one file attachment. In a preferred embodiment of the invention, the meta-data area of the logical loquium contains information descriptive of the attached file or files. The LPE will parse the loquium to extract the file attachment, place the assembled file in a separate storage area, and generate a query to the file index which contains, but is not limited to, the following information: the file name; the file size; the file date; the CID of the loquium containing the file; the LID of the loquium containing the file; the storage location of the file; the file type, if known to the device; and optionally, versioning information of the file. The LPE will replace the file with an alphanumeric string as a reference to the file attachment, or in the case of multiple attachments, multiple and separate references, within the content area of the loquium.

Upon user activation of a conversation whose loquia contain file attachments, the LPE requests all loquia from the loquia storage area and assembles the conversation in the manner described above. The LPE parses all loquia for references to external files. The LPE queries the files index for the storage coordinates of the indicated files. Upon visual presentation of the conversation to the user, the file references in the loquia are replaced by the displayed files themselves, when the computer platform is able to supply information about the default program for operation of such files, and such file types have previously been registered with the device as being safe to execute and/or display autonomously. For all other files, only an iconic representation of the file, which acts as a link to that file, will be displayed at the position of the indicated file attachment, as a means for the user to activate the file of his own volition.

An envisioned use of the invention is to facilitate cooperation among a plurality of users by aiding in the distribution of files for joint collaboration. Such a grouping may encompass users situated in physically distinct locations and/or the use of several and separate storage facilities. It also may entail multiple versions of a document, for example, transmitted multiple times between all Recipients of a conversation. The LPE will store each received file attachment in a storage area with a separate reference in the files index. This confers upon the present invention the ability to render any file attachment as a series of versions of the file for display to the user.

Upon a deliberate user action, or as the indirect result of a user action, or as a consequence of computer instructions in the client computer program to forward a loquium or a conversation, the LPE will assemble a loquium or loquia as appropriate for transmission; the alphanumeric file references are replaced within each loquium by the files as retrieved from the storage area, and the loquia are placed in a location for transmission.

Organisation, Management, Navigation, and Search of Conversations

The main window in one embodiment of the invention, illustrated in FIG. 4, lists all the conversations indexed for the current user profile, or identity. In the listing portion 20 of the main client window, each line represents a conversation, not a single message.

Similar to conventional e-mail, the conversations may be sorted into a series of folders 10, as per the user's own sorting preferences, carried out manually or through the use of message rules or filters. Loquia waiting to be transmitted, drafts, and loquia/conversations identified as questionable ("Junk"), have their own dedicated display folders 15. There is also a 'Deleted' folder for conversations that have been deleted by the user. Users may also create their own folder hierarchies for ease of cataloguing and navigation, by using means common on the platform or device. The default and user-created folders together form a folders collection.

A conversation may be catalogued in more than one user folder simultaneously, as by a user action of copying a conversation to another folder.

In a preferred implementation on devices and computer platforms that support a graphical user interface, the folders collection is represented as a tree of folders 10, typically displaying the root folder at the top of the tree with subfolders branching off as "child nodes", as commonly referred to in the art. Each child node may also host further child nodes, thus becoming, itself, a "parent node", as commonly referred to in the art.

Provided for in the present invention is an index of users and the conversations to which each user is currently subscribed. Such index contains information regarding: conversations indexed by CID; number of loquia indexed to the CID and to the user; number of loquia read by the user; last position within the indexed conversation; an identifier for the folder or folders in which the user has directed placement of the conversation; and flags, bookmarks, tags, or other indicators inserted by the user within loquia. It is to be appreciated that this is only a partial list of indicators.

Should a user indicate a desire to delete a conversation, by use of a Delete command 30, the folder reference for the conversation in the user index is changed to indicate the designated 'Deleted' folder. If the selected conversation is indexed in more than one user folder, the user is given the option to delete the conversation reference from only the current folder, from a subset of all folders, or from all folders. A conversation deleted from the 'Deleted' folder will cause the client computer program to decrement the loquium reference counter for all LIDs that are indexed to the relevant CID. For each loquium whence the reference counter has a zero value, the client computer program will perform the following actions: the loquium will be deleted from the storage area or areas; attachment files stored in the data storage areas will be deleted from the data storage areas; references to the loquia by LID will be deleted from the indices; and the LID will be deleted from the loquia reference counter.

In one embodiment of the invention, which could be preferred by corporate users or others who need messaging accountability, conversations and loquia which are "deleted" by a user are not physically deleted from the data storage areas. Rather, their public references are hidden so they cannot be viewed by users, and will be considered as if deleted.

In one embodiment of the invention, in which users can indicate their desire to store a file attachment independently of a conversation, the loquia of deleted conversations can be deleted from the data storage areas or their public references deleted in keeping with the embodiment of the invention preferred by the user, however neither the stored file attachment nor the indexed meta-data will be deleted. This information will be used for later searching and navigation, as described in this application.

Provided for in the invention is a means of reducing the number of displayed conversation headings for ease of user navigation and conversation selection. As a user selects a folder from the folders collection 10, by means normally used and appropriate on the device, the client computer program requests the LPE to query the indices for the conversation identifiers that are currently indexed to this particular folder. This subset of conversations is displayed in the conversation listing area 20 of the main window or screen.

Also provided for in the invention is a means of further filtering the conversation headings through an interactive method. The system of the present invention maintains various indices about the conversations whose contents are derived from the meta-data of the loquia, the content of the loquia, and the derived data about the conversations. A partial list of descriptors of any conversation includes: recipient names, recipient type (Originator, Participant, Observer), subject, date range, attachments, attachment type, and sender/receiver.

A user invokes an action to select a folder in the folders collection 10. The client computer program inserts a series of child nodes corresponding to the major descriptor headers. Initially the folders collection might take this form:

My Folder
|
+By Recipient
+By Date
+Subject
+Attachment

A user action to expand one of the child nodes by means common on the device and platform, for example "By Date", causes the client computer program to request from the LPE a query to the indices for relevant headings as constrained to conversations that are logged in "My Folder" and bounded by pre-defined date ranges. The folders collection might then be displayed thus:

My Folder
|
+By Recipient
+By Date
  +Today
  +Yesterday
  +This week
  +Last week
  +This month
  +Last month
  +Earlier
+Subject
+Attachment A user action to select one of the child nodes, for example "Yesterday", will cause the list of conversation headings 20 to be constrained by the relevant parameters, in the case of the example, conversations that are both logged in "My Folder" and have a last activity date of "Yesterday". It is to be appreciated that a user selection of the heading "This week" would cause a larger subset of the conversations logged in "My Folder" to be displayed, namely all conversations with activity in the past calendar week.

A user action to expand one of these child nodes (now considered a parent node) causes the client computer to redraw the conversations collection tree 10 and add new child nodes to the expanded parent node. The folders collection might then be displayed thus:

My Folder
|
+By Recipient
+By Date
  +Today
  +Yesterday
    +By Recipient
    +Subject
    +Attachment
  +This week
  +Last week
  +This month
  +Last month
  +Earlier
+Subject
+Attachment In an alternate fashion of displaying the folders collection, the tree may be redrawn as follows:

My Folder
|
+By Date
  +Today
  +Yesterday
    +By Recipient
    +Subject
    +Attachment
  +This week
  +Last week
  +This month
  +Last month
  +Earlier In this example the parent node "By Date" has become the primary node and the other major descriptor headers become child nodes of the currently selected node.

A user action to expand one of the new child nodes, for example "By Recipient", causes the client computer program to request from the LPE a query to the indices for relevant Recipient names as constrained to conversations that are logged in "My Folder" and had activity "Yesterday". Similarly, the computer program would redraw the folders collection tree and add all of the relevant Recipient names as child nodes. A user action to select one of these child nodes will cause the list of conversation headings to be constrained by the relevant parameters, in the case of the example, conversations that are logged in "My Folder", have a last activity date of "Yesterday" and involve the selected Recipient.

It will be appreciated that there are many combinations and permutations of the above method.

A user is able to search the indices by entering terms of interest in a search window, as is common in the industry. The user is also able to constrain the search to certain folders, date ranges, recipients, recipient types, a Boolean attachment search, by type of attachment, or by sender/receiver. The client program formats the search parameters in a search string, and requests the LPE 400 to query the indices 460 on the basis of this search string, using search routines common in the industry for searching through structured or unstructured data. The LPE will return the CIDs of conversations for which applicable loquia were found. The client program will display the list of applicable conversations. Ordering of the conversations is by chosen, preferred, or default ordering. In a preferred embodiment of the invention, the ordering of the conversations is based on a weighting algorithm that gives precedence to proportionality of search terms found in a conversation, tending to rank those conversations as more relevant and displaying them earlier in the order of the conversations.

Optionally, users may wish to provide descriptive terms of their own in order to index conversations or loquia for later reference. These terms are commonly known as "tags" in the industry. A user can apply a tag or multiple tags to a conversation or loquium by activating a user command for this purpose. The user can enter single words of text, each of which is considered to be a tag, as well as choose from previously entered tags. The client computer program will prepare a text string of these tags, indexed to the CID of the conversation or, alternatively, the LID of the loquium, or both, and request the LPE to perform an update query of the tags index with this information.

Use of Loquia to Carry out an Instruction or Process

A loquium assembled as outlined in this application may have an instruction code or codes that take the form of an alphanumeric string embedded within the content area. In certain embodiments of the invention, the content area may contain no human-readable content, only such instruction codes.

The LPE 400 interprets such instructions and may invoke a set of computer instructions to carry out the command or process. It will be appreciated that this capability can be used to enhance the present invention in many different ways beyond the intended core operability of the present invention.

2. Storage and Indexing of Loquia

In an embodiment of the invention which may be preferred by corporate/organizational users, a server computer may be provided. This server will hold one copy of each loquium in storage area 480, and one copy of each attachment, as well as the master record of the conversations and loquia 460. The master record of loquia contains a counter for each loquium, which is incremented each time that particular loquium is added to the archive of any user, and decremented whenever the loquium is deleted. Once the counter reaches zero, the loquium and associated records for that loquium may be purged.

The server has a record for each user of their conversations and the loquia that make up their specific view of each conversation. By connecting the client program 420 to the server, the LPE 400 on the server generates a list of the conversations to which the user has access. When a conversation is activated by the user, the server may assemble the conversation from the loquia listed for that particular user. This will greatly increase the efficient use of corporate resources and make management of the system easier.

A software programmer reasonably skilled in the art will recognise that a preferred implementation of the computer software program will be able to concurrently process multiple requests simultaneously from a multiplicity of devices and users. In one embodiment of the present invention, the server computer used for storage of the loquia is not a dedicated server. Standard e-mail servers can be used to store loquia and conversations in standard folders or e-mail "boxes". The loquia are stored in the user mailboxes, while the system creates, in parallel, a folder arborescence for conversations. The storage and retrieval of loquia of this system utilises standard e-mail transport protocols such as SMTP, and IMAP4.

3. Transmission, Verification, and Authentication of Loquia

Loquia generated by the computer program product of the present invention are placed in a storage area in advance of their transmission over a computer network or over a telecommunications network. The invention is able to select the best means for transmission of individual loquia on the basis of: available networks; measured speed of such networks; measured capacity of such networks; availability of connection of such networks to the destination addresses; security permissions on such networks. Common networks which the client computer program may encounter are: the Internet, an Ethernet network, an STMP gateway, a cellular data network, a private data network, and a Point to Point network.

Once the client program has determined the optimal available means to transmit the loquium between itself and the recipient client programs, the client program creates the appropriate data format for that network and transmits the loquium over the selected network. It will be appreciated by those familiar with the art that network dynamics change over relatively brief periods of time. In a preferred embodiment of the invention, the client computer program described herein takes advantage of the best available transmission means at the time of transmission, while retaining flexibility.

Loquia that are destined for the client program may also be received over any network to which the client program is connected. Through means commonly used in the art, the program 'listens' to these networks for transmission of loquia. Transmitted loquia arrive in a temporary storage area 435, which the LPE checks from time to time.

Figure 3:
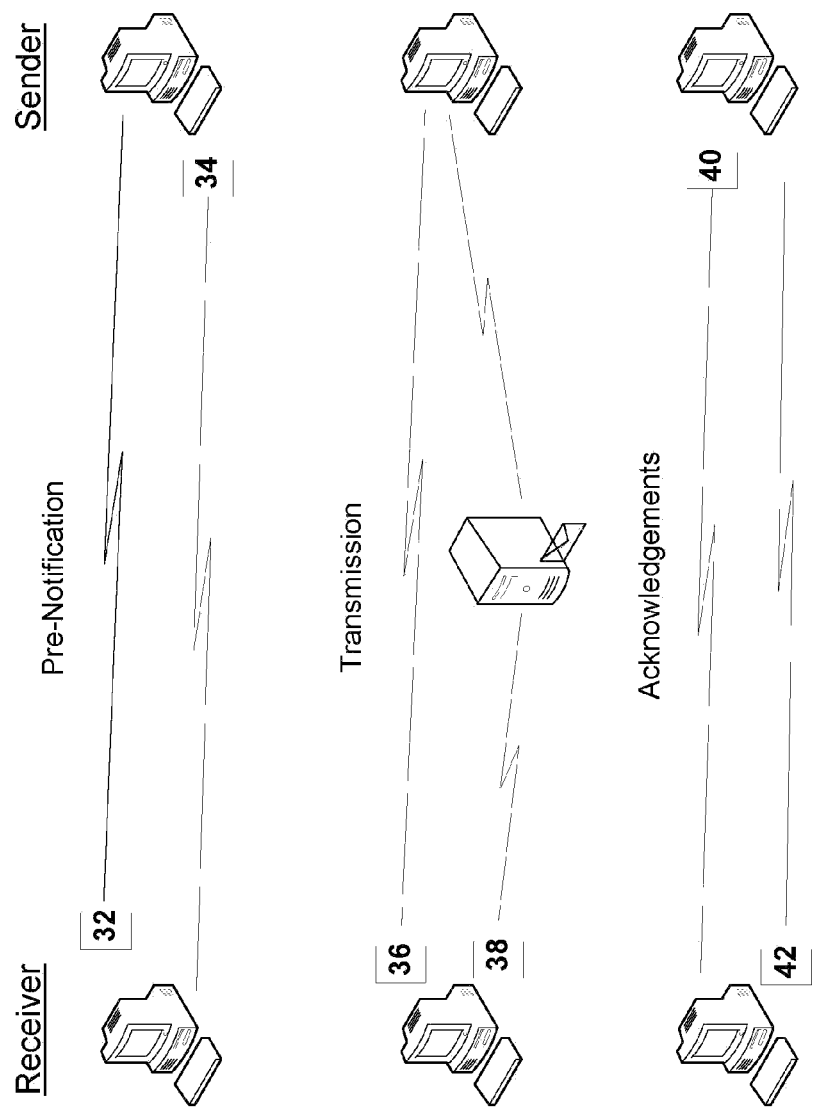
FIG. 3 is a schematic illustration of the background messaging exchange, according to one embodiment of the invention.

In contemporary messaging systems, there exists great potential for misuse and abuse of such systems. Envisioned in this invention is a system to manage the distribution of the loquia to the intended recipients to reduce such interference, one embodiment of which is illustrated in FIG. 3. The basic tenet of the described method is a series of "back-channel" requests and acknowledgements designed to prevent the transmission of loquia to Recipients who are unable to receive such loquia, or do not desire to receive such loquia, and to increase confidence in the purported identities of the senders of loquia.

Thus, when a client application wants to participate in an existing conversation or initiate a new conversation, it will encapsulate a message inside the structured file format described in this application as a loquium. The client then notifies each of the Recipients of desire to send loquium 32 and awaits receipt of acceptance or rejection 34. Upon receipt of acceptance 34, the prepared loquium is sent to the Recipient via direct point to point communication 36 or via an intermediary server 38. Preferably, the Recipient sends a confirmation of reception of the loquium (a "delivery receipt") 40.

The pre-notification 32 contains information about the loquium including: sender's identity credentials; LID; chronology; size of loquium; a Boolean attachment indicator; type(s) of attachment; and possibly a verification code for the loquium, which can be assembled using an algorithm that computes the verifier from various static and dynamic information about the computer, user account, message length, message content, conversation identifier, loquium type, and loquium identifier.

Once the pre-notification has been received, the Recipients' systems reply with an indication of their desirability to accept the loquium 34, which may be limited by, for example, account capacity, storage capacity, device type, ability of the receiving platform to render, display, play or otherwise use the attachment type, or availability of recipient. There is further provided in this invention a means to transmit a rejection 34 on the basis of a user's classification of a sender, often known in the industry as being "Black Listed" (indication by the user never to accept loquia/conversations from that sender). The client software will reject the loquium silently without returning an acknowledgement, unless the user has configured his client application to bounce the pre-notification back to black-listed senders.

The pre-notification 32 informs the Recipients' systems that a sender intends to send a loquium, and is used as a security measure by the present invention for authentication of the sender and loquium, once received. Once the process of notification and acknowledgement has completed, the client program "expects" the transmission of the loquium to occur within some amount of time. Such time can be a pre-determined interval, or an amount of time calculated by the client program on the basis of the loquium's size and the current network dynamics of the selected network.

Once a loquium is received 36 or 38, the Receivers' systems authenticate it with the sender's system by issuing a message that indicates receipt 40 of the loquium and relaying identifying characteristics of the loquium including, for example: receiver's security credentials; LID; chronology information; size of loquium; and a computed verification code for the loquium. This step increases the likelihood that the sender's system was the one that actually sent this loquium and that it was not intercepted or adjusted along the way. In this way, spam and other forms of e-mail abuse and other fraudulent messaging can be drastically reduced.

In an embodiment of this invention, upon receiving a delivery receipt 40 for a loquium, the system verifies that details of the delivery receipt match the relevant details of the pre-delivery notice 32. A deviation from the expected parameter values causes a warning notification 42 to be sent to the sender's and Recipient's systems, and marks the questionable loquium as suspect.

As a further enhancement of this invention, a delivery receipt 40 referencing a loquium not sent by the system may be used as an indication of a third party potentially abusing either of the participants' systems or identities.

In an embodiment of this invention, upon receiving a loquium for which a pre-notification was not received, the receiving system may issue a challenge 40 to the sending system. The sending system responds by transmitting a dispatch trace 42, which includes pertinent details of the loquium, such as: sender's identity credentials; LID; chronology; size of loquium; a Boolean attachment indicator; type(s) of attachment; network transmission information; and possibly a verification code for the loquium, which is assembled using an algorithm that computes the verifier from various static and dynamic information about the computer, user account, message length, message content, conversation identifier, loquium type, and loquium identifier. A deviation from the expected parameter values causes a warning notification to be sent to the sender's system, marks the received loquium as suspect and may be used as an indication of a third party potentially abusing either of the participants' systems or identities. The same is true in the case that there is no corresponding LID for the sender's system. A user may initiate the same scheme, by use of security command 192 on FIG. 7, in order to authenticate received loquia.

The client program can work without a mail server as an intermediary, or, in other words, as a Point to Point ("P2P") messaging system. The only requirement is access to the Internet. Using well-known protocols established for finding another computer or other connected devices on a network, such as the internet, the sender's client program establishes a communications channel with the receiver computer(s). The sender's computer activates the distribution mechanism, possibly as envisioned in this application, and begins the pre-notification procedure. All the components of the notification system, such as pre-notification, sending the loquium, and receipt confirmation, are carried out directly between the two computing devices without the use or need for the assistance of any other devices that may reside on the network, or intervention by the user.

Figure 11:
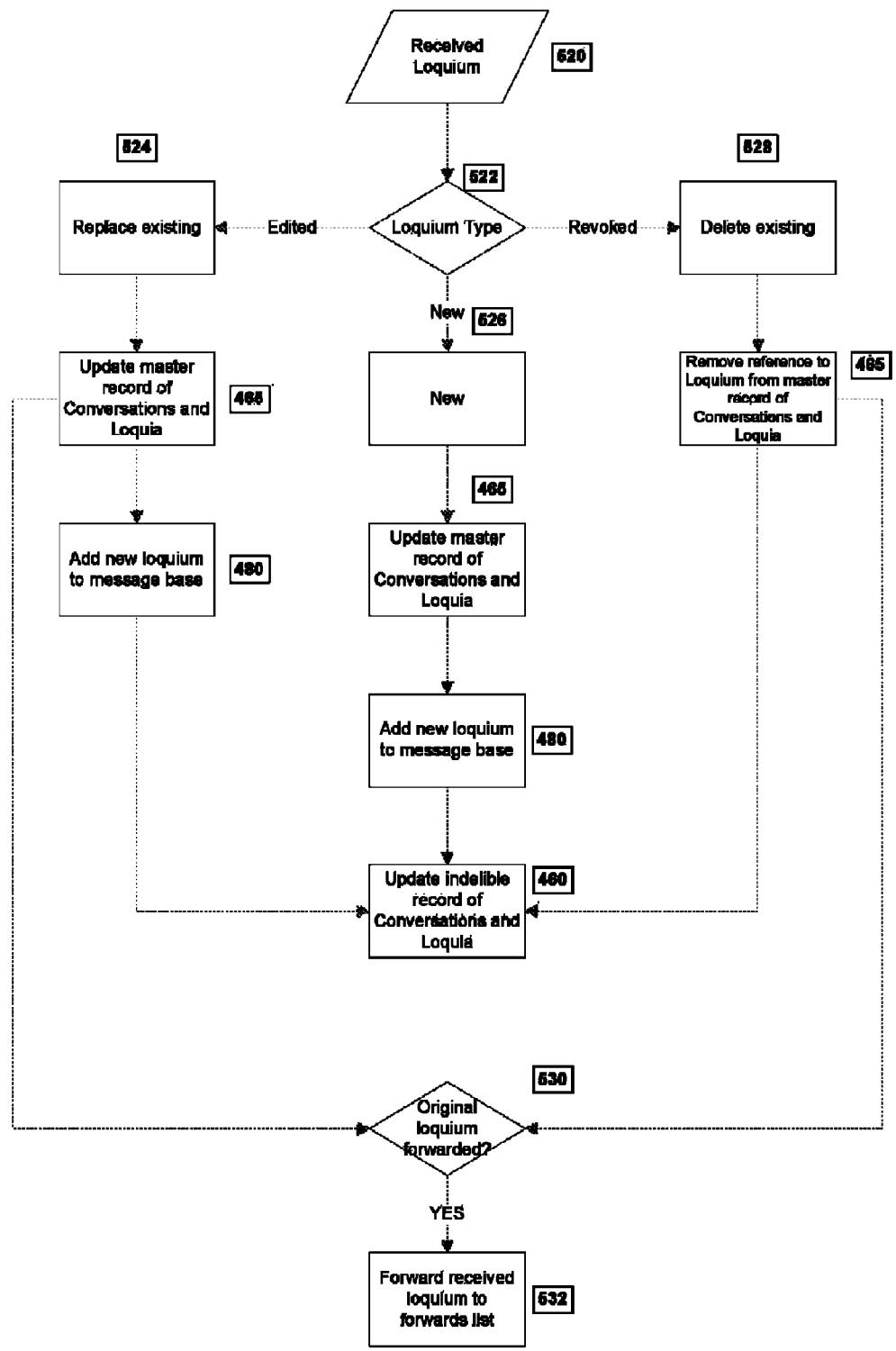
FIG. 11 is a flow chart illustrating inserting new, edited or revoked loquia of a conversation, according to one embodiment of the present invention.

4. Versioning of Loquia and Associated Files or Other Attachments, Revocation of Same, Use of Same in Collaborative Environments One component of the loquium verifier indicates the status of the loquium as either new (default condition), edited or revoked, when sent by the client program. Upon receipt by other client programs, it is handled as shown in FIG. 11, a flowchart illustrating inserting new, edited or revoked loquia into a conversation, according to one embodiment of the present invention. The loquium is inserted in the data storage areas as shown, and an entry is made in the master table of conversations and loquia.

By selecting a previously transmitted loquium and engaging an editor window in a client application capable of editing loquia, an author can post-facto edit that loquium, as shown at 180 in the menu on FIG. 6. Upon the user activating a Send command, the client program places the edited loquium in a storage area 435 pending transmission, and informs the LPE 400. The LPE adds versioning information to the LID, queries the indices to update their logs for that LID, and assembles the loquium as described with reference to FIG. 9. The procedure for pre-notification, transmission, and confirmation of loquia, as illustrated in FIG. 3, is then invoked.

With reference to FIG. 11, there is shown a flow chart illustrating the method for treating received loquia, according to one embodiment of the invention. Upon reception 520 of a loquium, the LPE of the receiving application determines the loquium type 522. If the LPE notes that the LID is of a new loquium 526, it updates the master record of conversations and loquia 465. The new loquium is then placed in the data storage area 480, and the permanent record of all conversations and loquia 460 is updated. It will be appreciated that all loquia are stored within a single (logical) storage area, here illustrated as the data storage area 480, regardless of their origin or status. Similarly all the records pertaining to the disposition of loquia are stored in a single location—master record 465, which is an index in the collection of indices 460.

If the LPE notes that the LID contains versioning information, it concludes that the loquium type 522 is "edited". It now queries its related indices to update its logs by replacing 524 the originally stored message with the later version. It also updates the master record of conversations and loquia 465, and places the updated loquium in a data storage area 480. Any relevant conversation displayed or otherwise interacted with will now reference the new loquium in place of the previous loquium. In this way, originators may change their submissions, even after they are already in the hands of Recipients.

A possible result of querying the indices is an indication that the previous version of the loquium, based upon its LID and versioning information, has been forwarded to other Recipients or otherwise transmitted 530. The LPE will then invoke the procedure 532 to transmit the replacement loquium to that Recipient list with the original recipient classes and designations, so that the recipient client applications can also replace the loquium in their conversation bases.

The cycle will then be repeated by those receiving applications. In this manner, a change made by the originator of a loquium will be propagated to all recipients of said loquium, even those who are secondary, tertiary, and further down the chain of recipients. It will be appreciated that this method can be applied any number of times to any loquium.

In an embodiment of the invention which could be preferred by commercial users, the original loquia will be retained in storage area 480 and indexed 460 in an indelible record of conversations and loquia, for compliance purposes. However, only the most recent version of any loquium would be displayed or otherwise directly referenced.

A derivative benefit from retaining more than one version of a loquium is an embodiment of the invention where users can follow the changes of a loquium over time. The same is true of conversations constructed from loquia. In this way, a user, or group of users, can construct a collaborative document containing textual and binary data and be able to navigate through its various iterations from within the conversation screen or window. Since the master record of conversations and loquia 465 contains a record for each loquium's LID and version, and all of the loquia are stored in storage area 480, the various versions can be displayed as desired.

In the same manner, an author of a loquium may choose to revoke or delete the loquium. The author's client application will prepare a loquium with the same LID but containing no contents other than an instruction to delete the referenced LID. Upon reception of the loquium 520, the Receiver's LPE will interpret the delete instruction 522 to indicate that the loquium is to be revoked. Referencing the LID of the received loquium, the Receiver's LPE initiates the procedure 528 to purge the loquium and associated information from the master record of conversations and loquia 465 and from data storage area 480. As with reference to edited loquia, the indelible record of conversations and loquia will be updated 460 to retain in storage, but not display, the revoked loquium.

The meta-data is used to optionally and automatically maintain a collaborative ecosystem of synchronized material, such as a project's arborescence and document revisions, in a distributed environment, without being required, as in many current collaborative computer program products, to request such material from a shared storage area and accessed through a virtual private network.

Upon the first reception of a loquium and indexing of the meta-data, the Recipient is prompted to indicate working preferences with regards to the loquium or conversation, for example if he wishes to utilise the existing network paths for the attachments. These rules are stored in the indices and are automatically applied to subsequent received content belonging to the same conversation.

As envisioned in this invention, loquia may also be used for transporting data that is not part of a conversation, but rather for maintenance of the client application or enhancing an application feature. For example, a user may make a change to his account information and wish to have that information propagated to some or all of the contacts in his address book. Without user intervention, the application invokes a set of computer instructions to create a loquium with this information, embeds a pre-defined instruction code within the content area, and transmits the loquium. Upon receipt of this loquium, the Recipients' client applications recognise this code, and autonomously update the local addressing information for the sender that they maintain. The loquium would not be displayed as part of a conversation. It is to be appreciated that this is one example, and does not limit other potential uses of this method, nor prevent the use of other means to exchange addressing information with other users.

5. Interaction with Non-Compliant Systems for Incoming and Outgoing Messages

Figure 2:
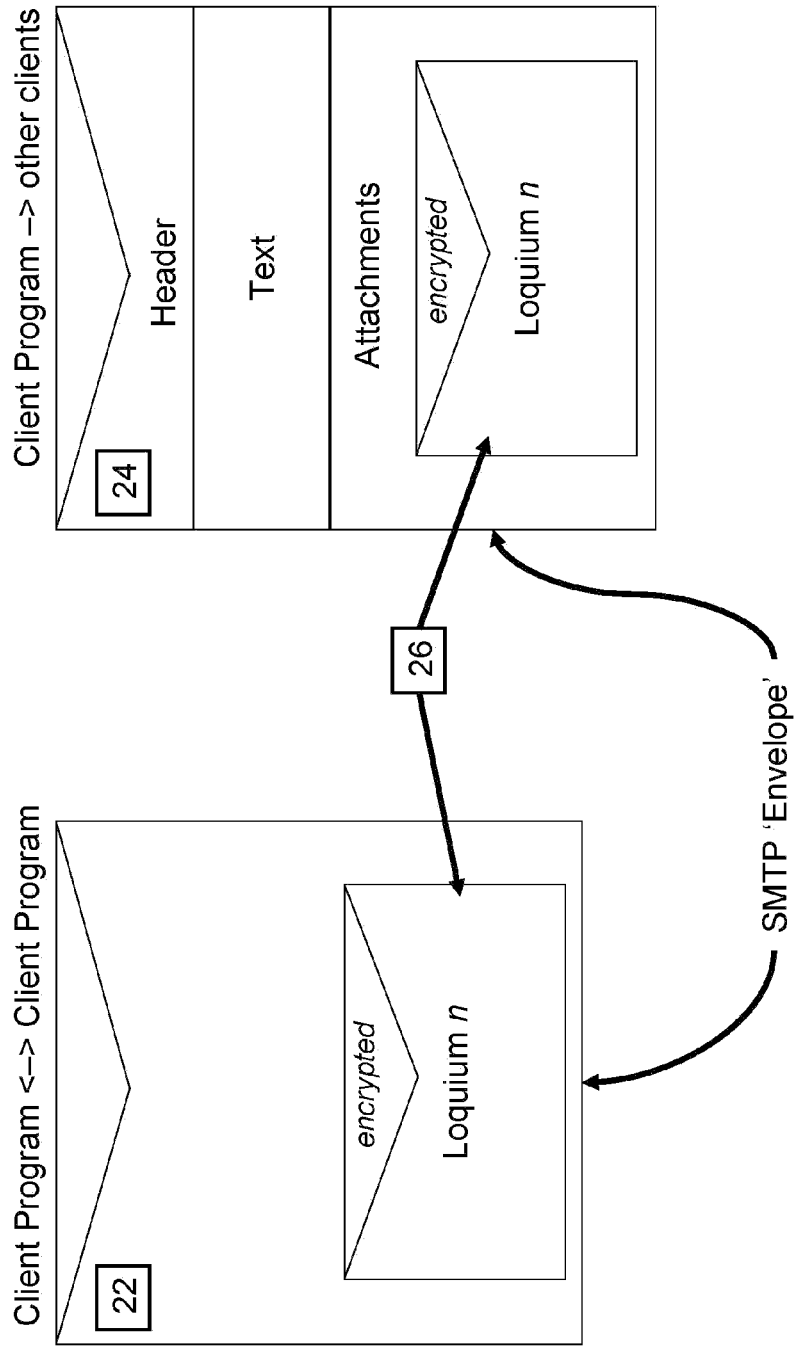
FIG. 2 is a schematic illustration of how the Simple Mail Transport Protocol ("SMTP") might be used to transport loquia to both Client Programs built according to one embodiment of the invention, and to other programs not according to the invention.

In one embodiment of the present invention, as illustrated in FIG. 2, the client program prepares an SMTP 'envelope' 22 in accordance with protocols commonly in use for the sending and transport of e-mail, whereupon the address information for Participants, Observers, and Hidden Observers is inserted into the corresponding SMTP fields for TO, CC, and BCC, respectively. In a possible implementation utilising SMTP, as illustrated in FIG. 2, for the transport of loquia, the SMTP envelope 24 of loquia sent to programs not built according to the invention may only contain the address information for Participants inserted into the TO field and omit the addressing information for Observers or Hidden Observers. In both cases, the loquium 26 is added to the SMTP 'envelope' 22 or 24.

As an enhancement of this embodiment, shown in FIG. 3, a standard SMTP e-mail is sent to addressees for whom information about conformance to the present invention is unknown to the client application. Included in this e-mail are any attachments as would be sent according to the S/MIME protocol. The loquium is added as an attachment 26, as shown in FIG. 2. Non-compliant messaging programs ignore the loquium, however, client computer applications compliant with this invention recognise the loquium 36 or 38 and issue a delivery confirmation 40. Upon receipt of the delivery confirmation 40, and hence confirmation that the recipient's system conforms to the present invention, the sender's system would update addressing information for the Recipient and henceforth initiate communications according to the methods of the present invention.

Figure 14:
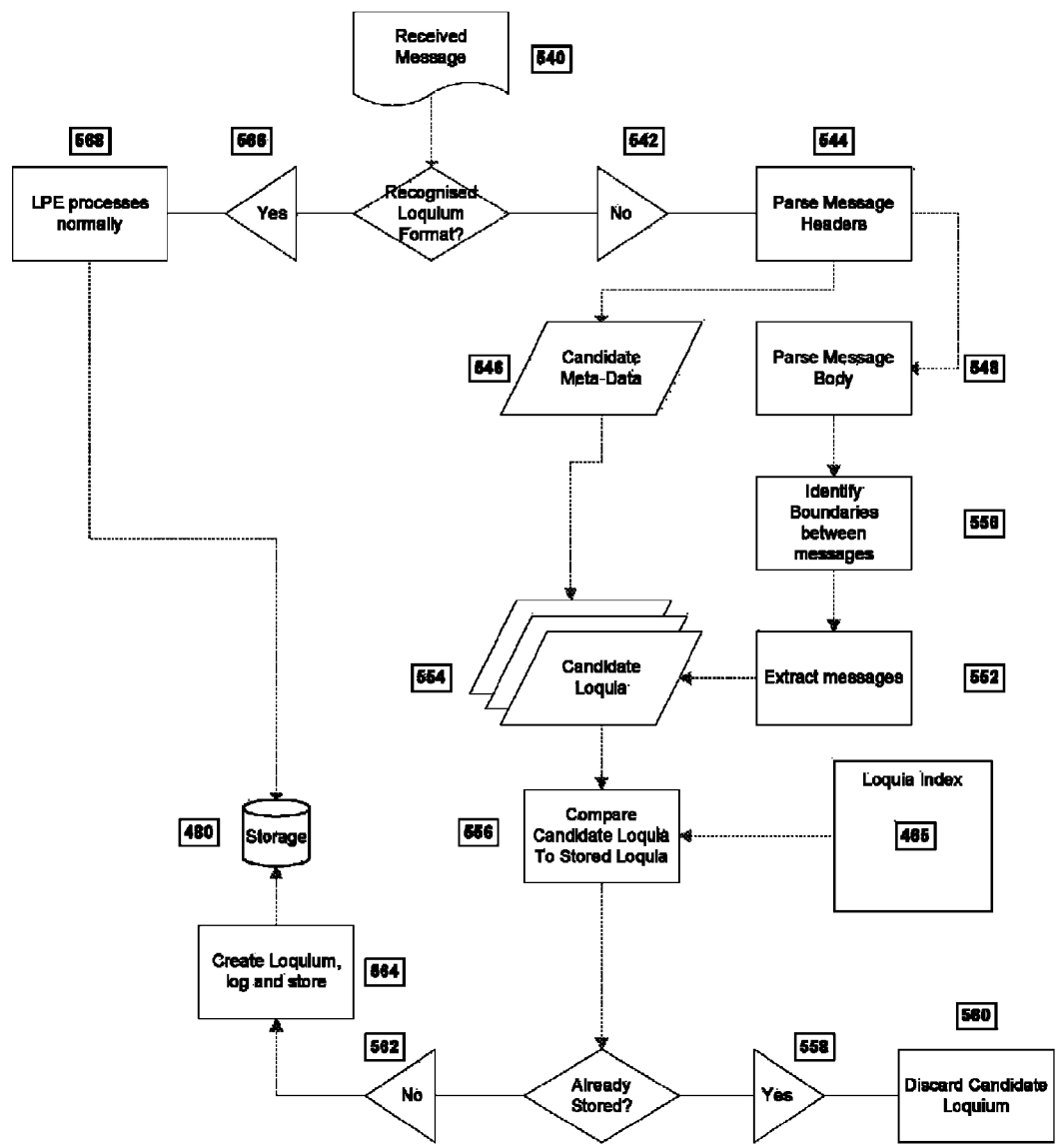
FIG. 14 is a flow chart illustrating the processing of incoming messages that do not comply with the invention, their translation to loquia, and their indexing and storage, according to one embodiment of the present invention.

The messaging system of the present invention implements standard messaging protocols such as SMTP. As illustrated in FIG. 14, incoming messages 540 sent by applications compliant with the present invention 566 are processed as normal incoming messages 568 and stored in storage area 480.

Incoming messages 540 sent by applications not compliant with the present invention 542 are treated as non-compliant messages. The message headers, for example encoded as HTML or SMTP-complaint mail, are parsed 544 by the LPE and candidate meta-data extracted 546. The message body is now parsed 548. The parser recognises the boundaries 550 between multiple message entries in a single complex message and sections the complex message into individual entries 552. The individual messages 552, together with the candidate meta-data 546, are transcribed into candidate loquia 554. These candidate loquia 554 are compared 556 with loquia descriptors stored in the indices 465. Should they be duplicates 558 of existing loquia, they are discarded 560. If they are new loquia 562, the loquia are indexed 564 to the proper conversations and stored in data storage area 480.

The client program monitors the user's resident and active Instant Messaging ("IM") programs by activating interfaces built in to such programs. By querying the IM programs, the messaging system determines if a conversation participant is available for IM. If so, the client application initiates an instant messaging session with the participant using the installed IM programs for continuing the conversation. If the user selects a recording option, the subsequent chat session is recorded as conversation loquia and added to the data storage area. The user may choose to save the IM session for himself and the other IM participant only, in which case an entry in the master record of conversations will be made as a conversation-thread. Alternatively, if the user indicates he wishes to allow all default conversation recipients to view the loquia generated from the IM session, the system will list the loquia with the master records of conversations as part of the main conversation and publish them to all Recipients. Similarly, by adding an SMS logger (an apparatus with the ability to receive and store text and multimedia messages commonly sent across cellular (telephony) networks on an appropriate medium), text messages from mobile phones and their equivalents can be added to any conversation using the same mechanism.

If the conversation participants choose to engage in a VoIP session, this session can be recorded with the appropriate apparatus, stored on a medium, such as a computer hard drive, and an index link to this session will be created within a loquium indexed to the conversation listing. As in the case of IM, the participants of the session can select to make the VoIP session available only to themselves, or they can elect to make the session available to other participants. If the user chooses to save the VoIP session for himself and the other VoIP participant, the index link in the master record of conversations will be set as a conversation-thread. Alternatively, if the user allows all default conversation recipients to hear the VoIP conversation, the system will list the index links with the master records of conversations in each client as part of the main conversation.

6. Security Considerations

In a preferred implementation of the present invention, the loquia are maintained and stored in their original received state and are not transcribed nor disassembled by any means, except at the time that a conversation is indexed by the LPE or a conversation is assembled for viewing. In this way, any protected, confidential, proprietary, licensed or otherwise private content is stored in a storage area for access through a client computer program, only, and cannot be independently extracted from the loquium as a whole.

Inherently, the system of the present invention is able to reduce the vexing phenomenon among messaging systems known colloquially as "spam" by means of the verification and authentication system for loquia, described above with respect to FIG. 3. Unsolicited messages are verified by this means and, if the verification result is negative, the loquia and/or conversations are flagged as suspect or "junk". Such messages may be automatically placed in a folder for the purpose of triaging "junk mail" or may be deleted outright, at the option of the user.

Inherently, the system of the present invention is able to reduce the malicious practice known colloquially as "spoofing"—using an established identity to fraudulently masquerade as that person by another for malevolent purpose—by means of the verification and authentication system for loquia, shown in FIG. 3.

A possible malicious attack using the system of the present invention may be attempted by sending verification challenges to lists of destinations, or randomly generated addresses. In the industry, this is known as a "phishing" attack. In a preferred implementation of the system, a verification challenge involving at least 2 pieces of non-credible information, such as a non-existent LID and a previously unknown sender, will be ignored by the system and no responses sent. In this way, the existence of the target address is neither confirmed nor denied, thus denying spammers one of their strategies for gleaning legitimate addresses.

The use of Point-To-Point communications means increases the confidence that exchanges have taken place in a more secure manner than transmitting discrete messages over public networks where they may be intercepted during transmission, or otherwise copied while stored on transitory intermediary servers.

Optionally, an implementation of the present invention may cause a loquium to be apportioned into a plurality of loquia and sent at different intervals over one or more different routes and different networks, as described with regard to FIG. 12. In this way, an attempt to intercept messages may not successfully gather all parts of a logical loquium, thereby denying the attackers the full contents of the loquium.

A malicious attack may be attempted by inserting dangerous instructions inside the content area, sometimes known as a "Trojan horse" attack. In a preferred implementation of the system of the present invention, the instructions embedded in the content area of the loquium are not executable computer instructions, but rather codes used to invoke functions of the computer client product.

In a preferred implementation of the present invention, tags inserted within the content may be used to direct the computer application used to display the conversation, to not display a portion of the content for some users on the basis of their permissions/class.

In a preferred implementation of the present invention, the user is able to apply well-known encryption schemes and methodologies through the activation of security command 198. Upon activation of this command, the user is presented with a list of possible encryption schemes for the loquium. Once chosen, the user contribution that is to form the content of the loquium is encrypted in the manner and scheme specified through means that conform to the specification of such encryption scheme. Such schemes are outside the scope of the present invention. The loquium is then assembled in the manner described in this application, with relevant security details as may be required by the encryption scheme added to the meta-data area of the loquium.

7. Use of Loquia in Social Networks and Other Means of Collaboration

A growing phenomenon amongst internet users is the use of public social networks, a part of the larger internet trend commonly known as Web 2.0. Social networking involves imparting information about oneself, voluntarily or otherwise, which can then be viewed by subscribers to the social network service and are aggregated to create an overall profile of the participant.

Envisioned in the present invention is a means to disseminate information for both public and private social networks in a manner that preserves the integrity of such information, and prevents its use outside of the intended application without deliberate user action, by the use of loquia.

A loquium is assembled by a client computer program which may be resident on a device or platform accessed by a user, or resides on a computer network in a central location, such as an internet website. Each user contribution is enclosed in a loquium and addressed to self. The loquium's content is added to the corpus of information about the participant as part of the ongoing process of developing the participant's profile.

A user purposely forwards the loquium to other users of the social network by use of a command action or through an automated action of the computer program product. The loquium's content is added to the corpus of information about the sender as part of the ongoing process of developing the sender's profile maintained by the Recipients.

8. Personalization of Client Program and Server Program

In an embodiment of this invention implemented as a resident software program, the client can be used by several users on the same machine, for example, in the case of family members who share a single device. In addition, one user can have several different 'identities' which can be shared across several different client computer programs on different machines.

Each user on a single computer prepares a user profile, which is stored within the indices on that machine. Each user profile preferably contains information about that user's address and identity, and the values of any customizable options. This aspect of the invention can also be implemented as a server, so that users can remotely access the information stored on one machine from a client on another device, once security and identity credentials have been presented and authenticated by means common in the industry.

As part of the user profile, a user may specify a "signature" through the use of security command 200. The signature may contain information about the user, such as contact information. The signature may be transmitted, at the user's option, with any or all loquia. The signature may be added as formatted or unformatted text to the end of a loquium's content, or as a file attachment to the loquium.

In an embodiment of the invention which may be preferred by corporate/organizational users, a server computer may be provided. This server will hold one copy of each loquium, and one copy of each attachment, as well as the master record of the conversations and loquia. The server will have a record for each user of their conversations and the loquia that make up their specific view of each conversation. By connecting the client program to the server, the server will generate a list of the conversations to which the user has access. When a conversation is activated by the user, the server may assemble the conversation from the loquia listed for that particular user. This will greatly increase the efficient use of corporate resources and make management of the system easier.

There are at least nine aspects of the invention having novel elements or uses, although the invention is not limited to these elements or uses. These include:
1. Features of the user interface
2. Message loquium storage, dissemination; intelligent assembly of the message loquia into a coherent conversation format; and transport
3. Message pre-advice, notification, authentication
4. Editing/revocation of loquium
5. Server system for storing and managing the message loquia, and management of users assigned to that server
6. Point-to-point (P2P) messaging system (no intermediate server required)
7. Integration of many different messaging/communication types (e-mail, IM, VoIP, SMS gateway) in order to provide a seamless and stateless end-to-end communication system
8. Security implications of messaging system in reducing spam, spoofing, phishing and other forms of fraudulent e-mails
9. Use of loquium for the secure distribution and storage of personal information and other proprietary content While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An electronic messaging system comprising:
   at least two electronic messaging platforms, each electronic messaging platform including:
   software means for generating electronic message loquia, each said electronic message loquium consisting of a single unit of an on-going dialogue between said two platforms in the form of a file including message content and identification information, said identification information including a unique alphanumeric string derived from a unique conversation identifier, and including timing information and security information;
   software means for automatically carrying out background messaging concerning transmission and receipt of loquia directly between said two platforms including an acknowledgement provided by a recipient indicating loquium identifier (LID) and computed verification code of loquia during dialog using said loquia before storage or display of the loquium;
   means for organizing said loquia according to said identification information for storage and display; and
   a display for displaying said loquia;
   wherein:
   each said loquium further comprises meta-data including permission information and addressing information; and
   wherein said identification information includes a Loquium Identifier (LID) permanently associated with said loquium permitting assembly of conversations including said loquium according to a pre-selected order derived from said identification information.

2. The electronic messaging system according to claim 1, further comprising software means for automatically arranging transmitted and received loquia in a conversation according to pre-defined criteria.

3. The electronic messaging system according to claim 1, wherein said electronic message loquia are created from content of message streams selected from the group consisting of: e-mail, SMS, VoIP, IM, on-line synchronous messaging and on-line asynchronous messaging systems.

4. The electronic messaging system according to claim 1, further comprising:
   a loquium processing engine for storing and executing said software means;
   a data storage area for storing said loquia;
   a master index for storing said identification information.

5. The electronic messaging system according to claim 4, further comprising an attachment repository.

6. The system according to claim 1, wherein said acknowledgment further includes a receiver's security credential, chronology information and size of loquium.

7. An electronic messaging system comprising:
   at least two electronic messaging platforms, each electronic messaging platform including:
   software means for generating electronic message loquia, each said electronic message loquium consisting of a single unit of an on-going dialogue between said two platforms in the form of a file including message content and identification information, said identification information including a unique alphanumeric string derived from a unique conversation identifier, and including timing information and security information;
   software means for automatically carrying out background messaging concerning transmission and receipt of loquia directly between said two platforms including an acknowledgement provided by a recipient indicating loquium identifier (LID) and computed verification code of loquia during dialog using said loquia before storage or display of the loquium;
   means for organizing said loquia according to said identification information for storage and display; and
   a display for displaying said loquia;
   further comprising:
   a client program in each of said electronic messaging platforms for facilitating exchange of message loquia between a plurality of parties;
   said program including;
   software means for automatically generating electronic message loquia from message content and message information input by a user;
   software means for recording said message loquia; and
   software means for automatically organizing said message loquia in a selected order into conversations utilizing pre-selected parameters from said identification information.

8. The system according to claim 7, wherein said conversations include more than one thread, each thread having unique identification for organization and storage.

9. The system according to claim 7, wherein said client program includes means for automatically requesting loquia associated with a selected conversation, as per that conversation's Conversation ID, from a Loquium Processing Engine ("LPE"), for generating a new screen or window and for assembling a structured conversation from a subset of the loquia stored in a data storage area, as determined by a master record of conversations and loquia.

10. The electronic messaging system according to claim 7, further comprising:
    a loquium processing engine for storing and executing said software means;
    a data storage area for storing said loquia;
    a master index for storing said identification information.

11. An electronic messaging system comprising:
at least two electronic messaging platforms, each electronic messaging platform including:
software means for generating electronic message loquia, each said electronic message loquium consisting of a single unit of an on-going dialogue between said two platforms in the form of a file including message content and identification information, said identification information including a unique alphanumeric string derived from a unique conversation identifier, and including timing information and security information;
software means for automatically carrying out background messaging concerning transmission and receipt of loquia directly between said two platforms including an acknowledgement provided by a recipient indicating loquium identifier (LID) and computed verification code of loquia during dialog using said loquia before storage or display of the loquium;
means for organizing said loquia according to said identification information for storage and display; and
a display for displaying said loquia;
wherein said identification information includes a Conversation ID, a Loquium ID, a sender identifier, at least one recipient, attachment information, length of loquium, date and time, and a loquium type identifier.

12. The electronic messaging system according to claim 11, further comprising software means for automatically arranging transmitted and received loquia in a conversation according to pre-defined criteria.

13. The electronic messaging system according to claim 11, wherein said electronic message loquia are created from content of message streams selected from the group consisting of: e-mail, SMS, VoIP, IM, on-line synchronous messaging and on-line asynchronous messaging systems.

14. The electronic messaging system according to claim 11, further comprising:
a loquium processing engine for storing and executing said software means;
a data storage area for storing said loquia;
a master index for storing said identification information.

15. The system according to claim 11, wherein said acknowledgment further includes a receiver's security credential, chronology information and size of loquium.

* * * * *